(12) United States Patent
Crandall

(10) Patent No.: US 6,701,028 B1
(45) Date of Patent: Mar. 2, 2004

(54) METHOD AND APPARATUS FOR FAST SIGNAL CONVOLUTION USING SPLINE KERNEL

(75) Inventor: Richard E. Crandall, Portland, OR (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/480,908

(22) Filed: Jan. 11, 2000

(51) Int. Cl.$^7$ .................................................. G06K 9/64
(52) U.S. Cl. ...................... 382/279; 242/163; 242/441; 242/447; 708/5; 708/420; 708/813
(58) Field of Search ................................. 382/100, 254, 382/260, 264, 265, 272, 275, 276, 277, 279, 280, 281; 242/163, 327.1, 441, 447, 477.4, 536, 602, 910; 359/306, 560; 379/406.11; 708/5, 420, 813

(56) References Cited

U.S. PATENT DOCUMENTS

| | | | |
|---|---|---|---|
| 4,646,256 A | 2/1987 | Bracewell | 364/725 |
| 4,720,871 A | 1/1988 | Chambers | 382/42 |
| 5,151,953 A * | 9/1992 | Landeta | 382/279 |
| 5,881,178 A | 3/1999 | Tsykalov et al. | 382/260 |
| 5,917,961 A * | 6/1999 | Huonder | 382/279 |
| 5,926,580 A * | 7/1999 | McCoy | 382/279 |
| 6,580,836 B2 * | 6/2003 | Politis | 382/279 |

* cited by examiner

Primary Examiner—Jayanti K. Patel
Assistant Examiner—Abolfazl Tabatabai
(74) Attorney, Agent, or Firm—Jung-hua Kuo

(57) ABSTRACT

A fast convolution method applicable to convolve a signal with a smooth kernel that can be approximated by a spline kernel, and a system configured to perform such method using software or signal processing circuitry. Unlike Fourier-based convolution methods which require on the order of N log N arithmetic operations for a signal of length N, the method of the invention requires only on the order of N arithmetic operations to do so. Unlike wavelet-based convolution approximations (which typically also require more arithmetic operations than are required in accordance with the invention to convolve the same signal), the method of the invention is exact for convolution kernels which are spline kernels. Moreover, convolution in accordance with the invention can be acyclic convolution (achieved without zero-padding) or cyclic convolution, and in both cases the invention imposes no restriction (such as evenness) on signal length.

69 Claims, 3 Drawing Sheets

METHOD AND APPARATUS FOR FAST SIGNAL CONVOLUTION USING SPLINE KERNEL

FIELD OF THE INVENTION

The invention relates to signal processing methods and apparatus for performing convolution on data indicative of a pattern (e.g., image data indicative of a pixel array). In accordance with the invention, the convolution kernel is (or is approximated by) a spline function. Preferably the convolution kernel is (or is approximated by) a polynomial spline function that is piecewise a polynomial function.

BACKGROUND OF THE INVENTION

Convolution is commonly performed on signals in many contexts, including the fields of sound, still image, video, lithography, radio (radar) signal processing. Typically, the signals to be convolved are pattern signals. Each of the expressions "pattern" and "pattern signal" is used herein in a broad sense to denote a one-dimensional sequence or two-dimensional (or higher dimensional) array of data words (which can be, but need not be pixels). Typically, the data words comprise binary bits, and the convolution is performed in discrete fashion on the binary bits using software, digital signal processing circuitry, custom hardware, or FPGA systems (field programmable gate array based computing systems).

The term "data" herein denotes one or more signals indicative of data, and the expression "data word" herein denotes one or more signals indicative of a data word.

The motivations for implementing convolution rapidly, even when processing data indicative of very large patterns, are myriad. The present invention was motivated by the need for proximity correction in the field of lithography. In such problems, one attempts a two-dimensional convolution between data indicative of a large pattern "p" (where the pattern is a large one-dimensional or two-dimensional pixel array) and a diffusion kernel "d". Often the kernel "d" is Gaussian or a superposition of Gaussians, or is otherwise a smooth kernel. More specifically, the present invention grew out of attempts to establish a suitable "O(N)" algorithm (an algorithm requiring not more than on the order of "N" multiplications and additions) for convolving a one-dimensional pattern comprising N pixels, where N is very large, with a Gaussian kernel (or other smooth kernel) such that the convolution is exact or very close to exact, or a suitable "O(NN')" algorithm (an algorithm requiring not more than on the order of NN' multiplications and additions) for convolving a two-dimensional pattern comprising NN' pixels, where each of N and N' is very large) with a Gaussian kernel (or other smooth kernel) such that the convolution is exact or very close to exact.

The objective in performing proximity correction (in the field of lithography) is to generate a "raw" optical signal (or "raw" electron beam signal) which can be input to a set of reflective or refractive optics (or electron beam optics), in order to project the output of the optics as a desired pattern on a mask or wafer. To determine the characteristics of a raw optical signal (or raw electron beam signal) that are needed to cause projection of the desired pattern on the mask or wafer, a deconvolution operation is typically performed on a very large array of pixels (which determine a pattern "p") in order to correct for the well known proximity problem. In the case of electron beam lithography, the proximity problem results from electron scattering in the substrate (mask or wafer) being written. Such scattering exposes broadened areas on the substrate to electrons (i.e., an area surrounding each pixel to be written in addition to the pixel itself), with the scattering effectively broadening the electron beam beyond the beam diameter with which the beam is incident on the substrate.

In nearly all proximity correction schemes, such a deconvolution operation includes at least one convolution step. Accordingly, in performing typical proximity correction, a very large array of pixels (determining a pattern "p") must be convolved with a diffusion kernel. Although such a convolution is typically performed on a pattern comprising a very large array of binary pixels, this restriction is not essential in the following discussion and is not essential to implement the invention. Indeed, the invention can implement convolution on data indicative of any pattern "p" (which can be large or small, and can be either one-dimensional, two-dimensional, or more than two-dimensional, and can be determined by binary or non-binary data values), using any smooth convolution kernel "d" having characteristics to be described below.

For a data indicative of a pattern "p" and a convolution kernel "d" we consider the cyclic convolution:

$$(d \times p)_n = \sum_{i+j=n \,(\text{mod } N)} d_i p_j,$$

and an acyclic convolution which differs only in the indicial constraint and range:

$$(d \times_A p)_n = \sum_{i+j=n} d_i p_j,$$

where "$x_A$" denotes that convolution operator x has an acyclic character.

In one-dimensional cases (in which the pattern p is an ordered set of N data values and the kernel is an ordered set of M values), the result of the cyclic convolution has length N (it comprises N data values), and the result of the acyclic convolution has length M+N−1. Both one- and two-dimensional scenarios are of interest. In the case of a two-dimensional pattern "p" (i.e., a pattern determined by an N by N' array of data values), the indices n, i, j and domain lengths N in the noted formulae are 2-vectors.

It is standard that the convolution d×p can be cast as an equivalent matrix-vector product:

$$d \times p = Dp,$$

where D is the circulant matrix of d (hereinafter the "circulant" of d), whose 1-dimensional form is defined as:

$$D = \begin{pmatrix} d_0 & d_1 & d_2 & d_3 & \cdots & d_{N-1} \\ d_{N-1} & d_0 & d_1 & d_2 & \cdots & d_{N-2} \\ \vdots & & & & & \vdots \\ d_1 & d_2 & d_3 & d_4 & \cdots & d_0 \end{pmatrix}$$

As will be shown later, conventional methods for convolution can be cast in the language of matrix algebra.

The central idea of the invention is to approximate a smooth kernel d by a polynomial spline kernel f (where f is a spline function f(x) which is piecewise a polynomial of degree δ with M pieces $f_i(x)$), and then to use appropriate operators that annihilate (or flatten) each polynomial of given degree (in a manner to be explained) to calculate the convolution of f and p quickly. In some embodiments, the smooth kernel d is approximated (in accordance with the invention) by a spline kernel f which is not a polynomial spline kernel, but which consists of M pieces defined over adjacent segments of its range (in typical two-dimensional cases, the latter spline kernel is a radially symmetric function whose range is some continuous or discrete set of values of the radial parameter). Though "spline" convolution in accordance with the invention has features reminiscent of conventional wavelet schemes and is an O(N) algorithm (as are wavelet schemes), an advantage of the inventive "spline" convolution is that it can be performed (on data indicative of a pattern p consisting of N data values) with cN arithmetic operations (multiplications and additions), whereas conventional wavelet convolution on the same data would require bN arithmetic operations, where the factor "b" is typically (i.e., with typical error analysis) significantly larger than the factor "c." In other words, the implied big-O constant for the spline convolution is significantly smaller than the typical such constant for conventional wavelet convolution.

Other important advantages of the inventive spline convolution method will be discussed below. To better appreciate the advantages of the invention over conventional convolution methods, we next explain two types of conventional convolution methods: Fourier-based convolution and wavelet convolution.

As is well known, Fourier-based convolution is based on the elegant fact that if F is a Fourier matrix, say $$F_{jk} = e^{-2\pi i jk/N},$$

then the transformation $FDF^{-1}$ of the circulant is diagonal, whence we compute:

$$Dp = F^{-1}(FDF^{-1})Fp,$$

where the far-right operation Fp is the usual Fourier transform, the operation by the parenthetical part is (by virtue of diagonality) dyadic multiplication, and the final operation $F^{-1}$ is the inverse Fourier transform. For arbitrary D one requires actually three Fourier transforms, because the creation of the diagonal matrix $FDF^{-1}$ requires one transform. However, if D is fixed, and transformed on a one-time basis, then subsequent convolutions Dp only require two transforms each, as is well known. The complexity then of Fourier-based cyclic convolution is thus O(N log N) operations (i.e., on the order of N log N multiplications and additions) for convolving a pattern p of length N (a pattern determined by N data values), for the 2 or 3 FFTs (Fast Fourier Transforms) required. It should be noted that the Fourier method is an exact method (up to roundoff errors depending on the FFT precision).

Another class of conventional convolution methods are wavelet convolution methods, which by their nature are generally inexact. The idea underlying such methods is elegant, and runs as follows in the matrix-algebraic paradigm. Assume that, given an N-by-N circulant D, it is possible to find a matrix W (this is typically a so-called compact wavelet transform) which has the properties:

(1) W is unitary (i.e. $W^{-1}$ is the adjoint of W);

(2) W is sparse; and (3) $WDW^{-1}$ is sparse, where "sparse" in the present context denotes simply that for sparse S, any matrix-vector product Sx, for arbitrary x, involves reduced complexity O(N), rather than say $O(N^2)$. With the assumed properties, we can calculate:

$$Dp = W^{-1}(WDW^{-1})Wp$$

by way of three sparse-matrix-vector multiplications, noting that unitarity implies the sparseness of $W^{-1}$. Therefore the wavelet-based convolution complexity is O(N) for convolving a pattern p determined by N data values, except that it is generally impossible to find, for given circulant D, a matrix W that gives both sparsity properties rigorously. Typically, if the convolution kernel d is sufficiently smooth, then a wavelet operator W can be found such that within some acceptable approximation error the property (3) above holds. Above-noted properties (1) and (2) are common at least for the family of compact wavelets (it is property (3) that is usually approximate).

As noted, an advantage of "spline" convolution in accordance with the invention is that it can be performed (on data indicative of a pattern p comprising N data values) with cN arithmetic operations, whereas conventional wavelet convolution on the same data would require bN arithmetic operations, where (assuming typical error budgets) the factor "b" is significantly larger than the factor "c." Among the other important advantages of the inventive "spline" convolution method (over conventional convolution methods) are the following: spline convolution is exact with respect to the spline kernel f, whereas wavelet convolution schemes are approximate by design. (and error analysis for wavelet convolution is difficult to implement); the signal lengths for signals to be convolved by spline convolution are unrestricted (i.e., they need not be powers of two as in some conventional methods, and indeed they need not have any special form); and spline convolution allows acyclic convolution without padding with zeroes (whereas conventional Fourier schemes require full zero padding for acyclic convolution).

SUMMARY OF THE INVENTION

In a class of embodiments, the invention is a method for performing cyclic or acyclic convolution of a pattern "p" (i.e., data indicative of a pattern "p") with a smooth diffusion kernel d, to generate data indicative of the convolution result $$r = Dp,$$

where D is the circulant matrix (sometimes referred to herein as the "circulant") of d. The pattern "p" can be one-dimensional in the sense that it is determined by a continuous one-dimensional range (or discrete set) of data values (e.g., pixels), or it can be two-dimensional in the sense that it is determined by a continuous two-dimensional range of data values (or array of discrete data values), or p can have dimension greater than two. In typical discrete implementations, the pattern p is one-dimensional in the sense that it is determined by a discrete, ordered set of data values (e.g., pixels) $P_i$, where i varies from 0 to N−1 (where N is the signal length), or it is two-dimensional in the sense that it is determined by an array of data values $P_{ij}$, where i varies from 0 to N−1 and j varies from 0 to N'−1, or it has dimension greater than two (it is determined by a three- or higher-dimensional set of data values). Typically, the kernel d is determined by an array of data values $d_{ij}$, where i varies from 0 to N−1 and j varies from 0 to N'−1 (but the kernel d can alternatively be determined by a discrete set of data values $d_0$ through $d_{N-1}$).

In preferred embodiments, the inventive method accomplishes the convolution Dp, by performing the steps of:

(a) approximating the kernel d by a polynomial spline kernel f (unless the kernel d is itself a polynomial spline kernel, in which case d=f and step (a) is omitted);

(b) calculating $q = Bp = \Delta_{\delta+1} Fp$, where F is the circulant of kernel f, and $\Delta_{\delta+1}$ is an annihilation operator (whose form generally depends on the degree δ of the polynomial segments of F) which operates on circulant F in such a manner that $\Delta_{\delta+1}F=B$ is sparse; and (c) back-solving $\Delta_{\delta+1}r_{approx}=q$ to determine $r_{approx}=Fp$.

In cases in which the kernel d is itself a polynomial spline kernel (so that d=f, and F=D), the method yields an exact result ($r_{approx}=r=Dp$)

Otherwise, the error inherent in the method is (f−d)×p, where × denotes the cross product, and thus the error is bounded easily.

In one-dimensional cases (in which the pattern to be convolved is a one-dimensional pattern of length N), $\Delta_{\delta+1}$ has the form of the N×N circulant matrix defined as follows:

$$\Delta_{\delta+1} = \begin{bmatrix} +\binom{\delta+1}{0} & -\binom{\delta+1}{1} & +\binom{\delta+1}{2} & -\binom{\delta+1}{3} & \cdots & 0 \\ 0 & +\binom{\delta+1}{0} & -\binom{\delta+1}{1} & +\binom{\delta+1}{2} & \cdots & 0 \\ \vdots & & & & & \vdots \\ -\binom{\delta+1}{1} & +\binom{\delta+1}{2} & & \cdots & 0 & +\binom{\delta+1}{0} \end{bmatrix}$$

in which each entry is a binomial coefficient, and δ is the maximum degree of the spline segments of spline kernel f. For example, δ=2 where the spline kernel f comprises quadratic segments. In two- or higher-dimensional cases, the annihilation operators can be defined as $$\Delta = \partial_{x_1}^{n_1} \partial_{x_2}^{n_2} \ldots \partial_{x_d}^{n_d},$$

where $\partial_{x_n}^{\ n}$ is the n-th partial derivative with respect is to the h-th of d coordinates. For example, the Laplacian $$\nabla^2 = \partial_{x_1}^2 \ldots \partial_{x_d}^{n_2}$$

will annihilate piecewise-planar functions of d-dimensional arguments f=f ($x_1, x_2, \ldots x_d$). In the one-dimensional case, the end points of each segment (the "pivot points") of spline kernel f may be consecutive elements $d_i$ and $d_{i+1}$ of kernel d, and step (a) can be implemented by performing curve fitting to select each segment of the spline kernel as one which adequately matches a corresponding segment of the kernel d (provided that appropriate boundary conditions are satisfied at each pivot point, such as by derivative-matching or satisfying some other smoothness criterion at the pivot points).

In preferred implementations, step (c) includes a preliminary "ignition" step in which a small number of the lowest components of $r_{approx}=Fp$ are computed by exact multiplication of p by a few rows of F, and then a step of determining the rest of the components of $r_{approx}$ using a natural recurrence relation determined by the spline kernel and the operator $\Delta_{\delta+1}$. For example, in the one-dimensional case, the lowest components of $r_{approx}$ are $r_0, r_1, \ldots, r_\delta$, where "δ" is the maximum degree of the spline segments of spline kernel f (for example $r_0, r_1$, and $r_2$ where the spline kernel comprises quadratic segments), and these "δ" components are determined by exact multiplication of p by "δ" rows of F. Then, the rest of the components "rδ" are determined using a natural recurrence relation determined by the spline kernel and the operator $\Delta_{\delta+1}$. The "ignition" operation which generates the components $r_0, r_1, \ldots, r_\delta$, can be accomplished with O(N) computations. The recurrence relation calculation can also be accomplished with O(N) computations.

In other embodiments, the inventive convolution method accomplishes the convolution r=Dp by performing the steps of:

(a) approximating the kernel d by a polynomial spline kernel f (unless the kernel d is itself a polynomial spline kernel, in which case d=f and step (a) is omitted);

(b) calculating $q=Bp=\Delta_\delta Fp$, where F is the circulant of kernel f and $\Delta_\delta$ is a flattening operator (whose form generally depends on the degree δ of the polynomial segments of F, and which operates on circulant F such that $B=\Delta_\delta F$ is almost everywhere a locally constant matrix); and (c) back-solving. $\Delta_\delta r_{approx}=q$ to determine $r_{approx}=Fp$. In one-dimensional cases (in which p has length N), $\Delta_\delta$ has the form of the N×N circulant matrix:

$$\Delta_\delta = \begin{bmatrix} +\binom{\delta}{0} & -\binom{\delta}{1} & +\binom{\delta}{2} & -\binom{\delta}{3} & \cdots & 0 \\ 0 & +\binom{\delta}{0} & -\binom{\delta}{1} & +\binom{\delta}{2} & \cdots & 0 \\ \vdots & & & & & \vdots \\ -\binom{\delta}{1} & +\binom{\delta}{2} & & \cdots & 0 & +\binom{\delta}{0} \end{bmatrix}$$

in which each entry is a binomial coefficient, and δ is the maximum degree of the spline segments of spline kernel f. In higher-dimensional cases, the flattening operator $\Delta_\delta$ is defined similarly.

In the latter embodiments (those employing a flattening operator in step (b) rather than an annihilation operator), step (c) can be performed with fewer multiplications (since it can be performed with an "ignition" step which computes a smaller number of the lowest components of $r_{approx}=Fp$, i.e., only the components $r_{approx0}, r_{approx1}, \ldots, r_{approx\delta-1}$, where "δ" is the maximum degree of the spline segments of spline kernel f) but it requires more addition operations.

In other embodiments, the inventive method accomplishes the convolution Dp (where D is the circulant of smooth kernel d) by performing the steps of:

(a) approximating the kernel d by a spline kernel f which is not a polynomial spline kernel (unless the kernel d is itself such a spline kernel, other than a polynomial spline kernel, in which case d=f and step (a) is omitted);

(b) calculating q=Bp=AFp, where F is the circulant of kernel f, and A is an annihilation or flattening operator, where A operates on circulant F in such a manner that AF=B is sparse when A is an annihilation operator, and A operates on circulant F in such a manner that AF=B is almost everywhere a locally constant matrix when A is a flattening operator); and (c) back-solving $Ar_{approx}=q$ to determine $r_{approx}=Fp$.

In other embodiments, the invention is a computer programmed with software for performing convolution on data in accordance with any embodiment of the inventive method. Other embodiments of the invention include a digital signal processor including digital signal processing circuitry configured to perform convolution on data in accordance with any embodiment of the inventive method, an apparatus (such as custom or dedicated electronic circuitry, or a field programmable gate array based computing system ("FPGA system")) configured to perform convolution on data in accordance with any embodiment of the inventive method, and a lithography system including such digital signal processing circuitry, such custom or dedicated electronic circuitry, or such an FPGA system.

Also within the scope of the invention is a computer-readable storage medium which stores computer-executable instructions, wherein the instructions are such that a computer performs an embodiment of the inventive method in response to executing the instructions.

BRIEF DESCRIPTION OF THE DRAWINGS

FIG. 1 would be reflected through the origin to plot the full kernel d(x). Kernel d(x) is approximated in accordance with the invention by spline function f(x), which is piecewise a polynomial $f_i$(x) of degree δ, comprising M pieces $f_i$(x) each coinciding with a pair of adjacent pivot points.

DETAILED DESCRIPTION OF THE PREFERRED EMBODIMENTS

Figure 1:
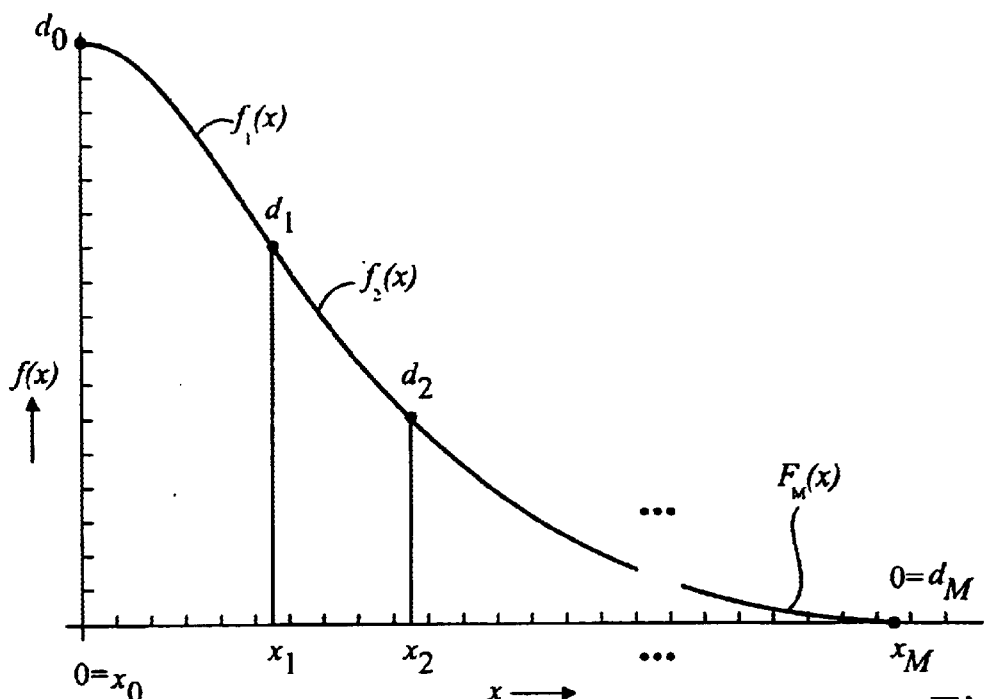
FIG. 1 is a graph of a continuous convolution kernel d(x) which passes through a set of pivot points {($x_i$, $d_i$:=d($x_i$)) :i=0, ..., M}.

Throughout the disclosure, including in the claims, the term "data" denotes one or more signals indicative of data words. Thus, the statement that data indicative of a pattern "p" is convolved (in accordance with the invention) with data indicative of a smooth kernel "d" denotes that one or more signals indicative of the pattern p is (are) processed with another set of one or more signals indicative of the kernel d, to generate data (i.e., one or more signals) indicative of the convolution result.

Preferred embodiments of the invention will be described with reference to "annihilation" and "flattening" operators.

First, consider the class of "annihilation" operators A which operate on a circulant matrix D in such a manner that B=AD is sparse.

When it is desired to perform a convolution r=Dp, if such an annihilation operator A can be found for D, one can in principle calculate $$A(Dp)=Bp,$$

and, hopefully, infer from A(Dp) the desired convolution Dp. The inventor has recognized that, surprisingly, such backsolution is sometimes possible even when A is singular. We explain (elsewhere herein) how this can occur.

Recognizing that such backsolution is sometimes possible, what follows is an overview of a fast convolution method (based on an annihilation operator) in accordance with the invention:

(1) given a convolution kernel d and its circulant matrix D, approximate the kernel d by a polynomial spline kernel f whose circulant is F and find an operator A such that B=AF is sparse (unless d is itself a polynomial spline kernel, in which case the operator A should have the property that B=AD is sparse);

(2) calculate q Bp (e.g., in O(N) operations); and (3) backsolve $Ar_{approx}$=q for $r_{approx}$ (e.g., in O(N) operations), optionally using an O(N) "ignition" step, to determine $r_{approx}$=Fp (which is a good approximation of r=Dp).

It is apparent that this method fails unless an appropriate operator A can be found in step (1) and the backsolution can be effected in step (3). We explain below that both conditions are met for a particular class of polynomial spline kernels ("f"), so that the method can in fact be implemented.

Next (still assuming a convolution kernel d and its circulant matrix D, which has been approximated by a polynomial spline kernel f whose circulant is F), consider the class of "flattening" operators C which operate on circulant matrix F in such a manner that G=CF is almost everywhere a locally constant matrix. We describe below a class of embodiments of the invention which employ such a flattening operator. Such embodiments are especially efficient in two-dimensional settings (i.e., where the pattern "p" to be convolved is two-dimensional).

Not only the embodiments of the invention which employ a "flattening" operator but also those which employ an annihilation operator assume a smooth convolution kernel d which is (or is approximated by) a polynomial spline kernel f. Accordingly, we next define what is meant by a polynomial spline kernel We assume (as is physically typical) that the desired convolution kernel "d" is a symmetrical function. That is, in one-dimensional cases we have d(x)=d(-x) and in two-dimensional cases the kernel d is a radial function (i.e., d=d(r), with d being independent of polar angle).

An example of a one-dimensional case will be described with reference to FIG. 1. FIG. 1 assumes a continuous convolution kernel d(x) which passes through a set of pivot points $$\{(x_i, d_i:=d(x_i))i0, \ldots, M\},$$

where for convenience (and physical meaning) we force $x_0$:=$d_M$:=0. The plot of FIG. 1 is to be reflected through the origin for the full kernel d(x). We approximate the kernel d(x) by a spline function f(x), which is piecewise a polynomial $f_i$(x) of degree δ with M pieces $f_i$(x), with the properties:

1) for each i=1, ..., M, the spline segment $f_i$(x) has degree at most δ and includes a pair of adjacent ones of the pivot points ($x_{i-1}$, $d_{i-1}$) and ($x_i$, $d_i$); and 2) other appropriate boundary conditions are satisfied, in the form of derivative-matching at pivot points or other smoothness criteria.

Thus, the spline kernel f(x) which is chosen to approximate the kernel d(x) is forced to pass through a set of pivot points of the kernel d(x), and to satisfy appropriate boundary conditions at the pivot points. In typical implementations of the invention in hardware or software, each of the kernels d(x) and f(x) is defined for a discrete set of values of x, and a discrete set of data values determines each kernel.

A degree-δ spline has segments generally of the form:

$$f_i(x) = a_{i0} + a_{i1}x + \ldots + a_{i\delta}x^\delta.$$

Thus, a set of M(δ+1) constraints of some kind are needed to determine completely the $\{a_{ij}\}$.

We next describe several examples of spline kernels f(x):

Example 1: a cubic (δ=3) spline kernel, with an arbitrary number M of (positive-x) pivot points, will comprise M segments (for positive values of x) each of the form:

$$f_i(x) = a_{i0} + a_{i1}x + a_{i2}x^2 + a_{i3}x^3, \; i=1, \ldots, M.$$

We need a total of 4M constraints to fully characterize this spline kernel. One way so to constrain the coefficients $a_{ij}$ is to force:

$$f_i(x_i) = d_i; \; f_i(x_{i+1}) = d_{i+1}; \; i=0, \ldots M-1, f'_i(x_0:=0)32 \; 0; \; f'_{M-1}(x_M) = 0$$

with the pivot points occurring at $d_i = d(x_i)$ for i=0, ..., M−1, and the last two conditions giving vanishing slopes at the origin and at the last pivot point, and finally $$f'_i(x_{i+1}) = f'_{i+1}(x_{i+1}); \; i=0, \ldots, M-2, \text{ and}$$

$$f''_i(x_{i+1}) = f''_{i+1}(x_{i+1}); \; i=0, \ldots, M-2,$$

Assuming such constraints, the total constraint count is 2M+2+2 (M−1)=4M, and so the polynomial coefficients $\{a_{ij}\}$ are determined. It should be appreciated that there are other ways to specify constraints, and any method that provides 4M constraints for a cubic spline is a candidate method. However it is known that the particular form of the derivative constraints set forth in this paragraph always allows a solvable, non-singular spline system.

Example 2: a quadratic-spline kernel (with δ=2, M=2, and pivot points $-x_1, -x_2, -x_1,$ and $x_2$) is given by:

$$f(x) = \begin{cases} a - b|x|_N^2; & |x|_N \leq x_1 \\ c(x_2 - |x|_N)^2; & |x|_N \in (x_1, x_2) \end{cases}$$

which amounts to a "bell curve" with parabolic central section (where $-x_1 < x < x_1$) and flanges (where $x < -x_1$ and $x > x_1$) of opposite curvature to complete the bell shape. The notation $|x|_N$ is used to denote the absolute distance from x to 0 (mod N) in whatever direction is shortest. So for example $|16|_{20}=4$, and so on. This ensures cyclic boundary conditions modulo the pattern length N. It should be noted that this spline vanishes as desired, at $x > x_2$ and $x < -x_2$. One set of admissibility conditions for this spline is:

$$c(1-2(x_2-x_1)) = b(1-2x_1),$$

$$a - bx_1^2 = c(x_2-x_1)^2,$$

which together ensure continuity of f(x) and its discrete derivative at point $(x_1, d_1:=f(x_1))$. Note the important feature of the discrete-derivative condition (the first of the two matching conditions)., that whereas the continuum calculus tells us we want $f'_1(x_1):=f'_2(x_1)$, which would lead to the condition $-2c(x_2-x_1)=2bx_1$, it is computationally convenient to demand instead:

$$f_1(x_1) - f_1(x_1-1) = f_2(x_1+1) - f_2(x_1),$$

i.e., to demand that the incoming derivative at the terminus of the $f_1$ segment agree with the outgoing derivative at the start of the $f_2$ segment. This matching of first-differences simplifies the sparse matrix construction.

Example 3: a quadratic-spline kernel f(x) is given by Example 2 with specific choices: $x_1=4; x_2=8; a=32; b=1;$ and $c=1$.

This is a "bell curve" which has pivot points at x=−4 and x=4 where the slope is conveniently continuous (in either continuous or discrete models, in this particular case), and which vanishes at x>8 and x<−8.

Example 4: Direct polynomial interpolation (of the whole kernel d(x)) to determine spline kernel. f(x) has not yet been considered, since the spline kernel determined by such a single-polynomial fit is just a degenerate (M=1) spline kernel. An example of such a spline kernel is a quartic-spline approximation (which is degenerate in the sense that M=1) to a normalized Gaussian kernel d(x), having form:

$$f(x) = a + cx^2 + ex^4,$$

with conditions on the range [−R,R]: $f(\pm R):=0$, $f'(\pm R):=0$, and either a curvature condition, inflection condition, or normalization condition:

$$\int_{-R}^{+R} f(x) \, dx = 1.$$

In the latter (normalized) case one finds a closed-form degenerate spline:

$$d(x) \approx f(x) = \frac{15}{8R} - \frac{15}{4R^3}x^2 + \frac{15}{8R^5}x^4,$$

for which the effective range R is a tuning parameter. An interesting aspect of such an M=1 spline is that the computational complexity for performing convolution in accordance with the invention (using such spline) turns out to be extremely low.

Preferred embodiments of the invention employ a specific class of "finite-difference" operators as annihilation or flattening operators. This class of finite difference operators is defined by the N-by-N circular matrix (in which each of the $N^2$ elements is a binomial coefficient):

$$\Delta_n = \begin{bmatrix} +\binom{n}{0} & -\binom{n}{1} & +\binom{n}{2} & -\binom{n}{3} & \cdots & 0 \\ 0 & +\binom{n}{0} & -\binom{n}{1} & +\binom{n}{2} & \cdots & 0 \\ \vdots & & & & & \vdots \\ -\binom{n}{1} & +\binom{n}{2} & \cdots & & 0 & +\binom{n}{0} \end{bmatrix}$$

Which is interpreted as an n-th order finite-difference operator in which each of the $N^2$ elements is a binomial coefficient. For example, when signal (pattern) length is N=6, the second-order operator is:

$$\Delta_2 = \begin{bmatrix} 1 & -2 & 1 & 0 & 0 & 0 \\ 0 & 1 & -2 & 1 & 0 & 0 \\ 0 & 0 & 1 & -2 & 1 & 0 \\ 0 & 0 & 0 & 1 & -2 & 1 \\ 1 & 0 & 0 & 0 & 1 & -2 \\ -2 & 1 & 0 & 0 & 0 & 1 \end{bmatrix}$$

In fact every $\Delta_n$ can be built up from successive applications of the first-difference operator $\Delta_1$.

An important ides at the core of the invention is that a degree-$\delta$ spline segment is annihilated by the $\Delta_{\delta+1}$ flattened (to a constant) by the $\Delta_\delta$ the only nonvanishing elements in the resulting sparse matrices AF (where "A" is $\Delta_{\delta+1}$ or $\Delta_\delta$) will arise from the pivot points per se.

It should be noted that the $\Delta_n$ are singular operators, but that this does not necessarily prevent one from backsolving relations of the form $\Delta_n r = q$ for r, with q given. The basic idea (allowing back-solution of relations of the form $\Delta_n r = q$) is to find a few entries of r and then use a natural recurrence relation. The procedure will be understood by considering the following example. This example assumes that the quadratic-spline kernel f(x) identified above as "Example 2" is the actual convolution kernel d(x). Thus, D=F is the circulant of d (i.e., the circulant of f). It can readily be established that, in this example:

$$\Delta_3 D = \begin{bmatrix} 0 & 0 & \cdots & -2b & -2c & 0 & \cdots & 0 & c & c & 0 & \cdots & \leftrightarrow \\ 0 & 0 & 0 & \cdots & -2b & -2c & 0 & \cdots & 0 & c & c & 0 & \cdots \\ \vdots & & & & & & & & & & & & \vdots \end{bmatrix}$$

where the nonvanishing terms in the top row of $\Delta_3 D$ (which is itself a circulant) are: four nonvanishing terms, starting with the term $-2b$, that occur at respective positions $x_1-2$, $x_1-1$, $x_2-2$, $x_2-1$ with position 0 being the leftmost of that row; and an additional set of the same four nonvanishing terms occurring at the natural reflections of $x_1$, $x_2$ (mod N), but with the signs reversed, as signified by the symbol $\Theta \rightarrow$. It is apparent that the matrix $\Delta_3 D$ is sparse, and we end up (assuming that it is desired to convolve data indicative of a one-dimensional pattern p with kernel d) with an explicit algorithm based on the following formal relations:

$r := Dp,$ $q := (\Delta_3 D)p = \Delta_3 r;$ and the following recurrence relation that arises from the particular annihilation operator $\Delta_3$:

$r_\mu - 3r_{\mu+1} + 3r_{\mu+2} - r_{\mu+3} = -2bp_{x1-2+\mu} - 2cp_{x1-1+\mu} - c(p_{2-2+\mu} + p_{s2-1+\mu}) + 2bp_{N-x1-2+\mu} + 2cp_{N-x1-1+\mu} - c(p_{N-x2-2+\mu} + p_{N-x2-1+\mu}),$ where $x_1$, $x_2$, $-x_1$, and $-x_2$ denote the pivot points of the kernel "f." Thus (still assuming the example in which the actual convolution kernel "d" is the quadratic-spline kernel "f" identified above as "Example 2"), coefficients $r_0$, $r_1$, and $r_2$ are precomputed (by exact multiplication of p by three rows of $\Delta_3 D$), and the remaining coefficients $r_\mu$ are calculated using the recurrence relation.

In view of the example set forth in the preceding paragraph, those of ordinary skill in the art can readily determine recurrence relations for other orders and dimensionalities.

Next, we describe preferred embodiments of the inventive method for fast convolution of data indicative of a pattern "p" (comprising N data values and thus having "length" N) with data indicative of a convolution kernel "d." In these embodiments, the kernel "d" is approximated by a quadratic-spline kernel f(x) having the form specified above in Example 2. Then, the following steps are performed:

the pivot points $x_1$, $x_2$, $-x_1$, and $-x_2$, and the remaining parameters a, b, c of the spline kernel f are determined (in some embodiments they may be chosen to have the values specified above in Example 3);

$q = \Delta_3 Fp$ is calculated, where F is the circulant of kernel f;

$\Delta_3 r_{approx} = q$ is back-solved to determine $r_{approx} = Fp$, by directly calculating the first three convolution elements $r_{approx0}$, $r_{approx1}$, and $r_{approx2}$ of $r_{approx} = Fp$ (this "ignition" operation requires O(N) operations), and then determining the remaining elements $r_{approx3}$, $r_{approx4}$, ..., $r_{approxN-1}$ using the recurrence relation set forth above (this requires O(N) additions but no multiplications by other than constants).

Although the last step requires some multiplications by constants, in actual practice, multiplication by a constant can be performed more rapidly and less expensively (in digital signal processing hardware) than can general multiplication. For example, multiplication (of binary bits indicative of a data value) by a power of two is merely a shift (e.g., implemented using a shift register), and multiplication by other constant multipliers can be implemented using lookup tables if the array of constants is not too extensive. For this reason, the count of operations specified in the. Theorem set forth below does not include multiplications by constants.

In other preferred embodiments of the inventive method for fast convolution of data indicative of a pattern "p" (having "length" N) with data indicative of a convolution kernel "d," the kernel "d" is approximated by a spline kernel f(x) of degree $\delta$ greater than 2. This includes determination of all pivot points and remaining parameters of the spline kernel f. Then, the following steps are performed:

$q = \Delta_\delta Fp$ is calculated, where F is the circulant of kernel f;

$\Delta_\delta r_{approx} = q$ is back-solved to determine $r_{approx} = Fp$, by directly calculating the first $\delta+1$ convolution elements $r_{approx0}$, $r_{approx1}$, ..., and $r_{approx\delta}$ of $r_{approx} = Fp$ (this "ignition" operation requires O(N) operations, assuming that N is much greater than $\delta$), and then determining the remaining elements $r_{approx\delta-1}$, ..., $r_{approxN-1}$ using a recurrence relation that arises from the particular annihilation operator $\Delta_\delta$ and circulant F (this requires O(N) additions but no multiplications other than by constants).

The inventor has established the following theorem (which applies to embodiments of the invention that include the step of back-solving $\Delta_{\delta+1} r_{approx} = (\Delta_{\delta+1} F) p$ to determine $r_{approx} = Fp$)

Theorem: For a degree-$\delta$ spline kernel f having M pivot points to the right of the origin (also referred to as M "positive" pivot points), each embodiment of the inventive method using annihilation operator $\Delta_{\delta+1}$ requires, within O(1), no more than $(\delta+1)N$ multiplies$+\delta(2M+1)N$ additions to resolve the full, length-N cyclic convolution f×p.

The convolution result f×p is equal to the desired convolution result d×p to within an easily bounded approximation error: $(f-d) \times p$. The convolution result f×p is exactly equal to d×p for a kernel d:=f (i.e., when d is itself piecewise polynomial).

Note that the count of multiplications in the Theorem (i.e., the term "$(\delta+1)N$") arises from the ignition procedure, whereby the elements $r_{approx0}$, $r_{approx1}$, ..., $r_{approx\delta}$ are calculated with a view to eventual recurrence. The additions count (the term "δ(2M+1)N") in the Theorem in turn arises from the use of the recurrence relation (the relevant sparse matrix $\Delta_{\delta+1}$ F has about 2Mδ nonvanishing diagonals). Thus, the Theorem implies that back-solution of $\Delta_\delta r_{approx}=q$ can always be accomplished using no more than the stated number of multiplications and additions by an "ignition" operation to determine the first δ+1 elements of $r_{approx}$ followed by use of a recurrence relation to determine the remaining elements $r_{approx\delta+1}, \ldots,$ and $r_{approxN-1}$ of "$r_{approx}$."

In other preferred embodiments of the invention, a flattening operator is used (rather than an annihilation operator) to reduce even further the maximum total number of multiplies that must be performed to resolve the full, length-N cyclic convolution f×p. For degree-δ spline kernels f(x), the inventor has determined that a suitable flattening operator is simply $\Delta_\delta$. It is straightforward to show that this flattening operator on a degree-δ polynomial segment generates a constant over the whole segment, except for endpoint effects. For example, in embodiments of the inventive method for fast convolution of data indicative of a pattern "p" (having length N in the sense that it is determined by N data values) with data indicative of a convolution kernel "d," the kernel "d" is approximated by a quadratic-spline kernel f(x) having the form specified above in Example 2. Then, the following steps are performed:

the pivot points $x_1, x_2, -x_1,$ and $-x_2$, and the remaining parameters a, b, c of the spline kernel f are determined (in some embodiments they may be chosen to have the values specified above in Example 3);

$q=\Delta_2 Fp$ is calculated, where F is the circulant of kernel f;

$\Delta_2 r_{approx}=q$ is back-solved to determine $r_{approx}=Fp$, by directly calculating the first two convolution elements $r_{approx0}$ and $r_{approx1}$ of $r_{approx}=Fp$ (this is an "ignition" operation), and then determining the remaining elements $r_{approx2}, r_{approx3}, \ldots, r_{approxN-1}$ using the relevant recurrence relation. Assuming for convenience that the spline kernel f is the actual convolution kernel d, D=F is the circulant of d (i.e., the circulant of f), and $\Delta_2 F=\Delta_2 D$ exhibits flattening:

$$\Delta_2 D = \begin{bmatrix} -2b & -2b & \cdots & -2b & 0 & 2c & 2c & \cdots & 2c & c & \leftrightarrow \\ -2b & -2b & -2b & \cdots & -2b & 0 & 2c & 2c & \cdots & 2c & c & \cdots \\ \vdots & & & & & & & & & & & \vdots \end{bmatrix}$$

for which the relevant recursion relation is of the form:

$r_\mu - 2r_{\mu+1} + r_{\mu+2}$=terms involving $p$, with the "p" terms on the right side of the recursion relation being easily calculated via row-to-row differencing (the first string of −2b terms in the top row of matrix $\Delta_2 F=\Delta_2 D$ convolves with pattern P in any two successive rows with slight differences only at endpoints of that spline segment, and so on). Thus one only need ignite the fast convolution algorithm via precomputation of $r_{approx0}$ and $r_{approx1}$, which requires about 2N multiplies (at the expense of more additions), as opposed to about 3N multiplies in embodiments of the invention employing annihilation operator $\Delta_3$ (rather than flattening operator $\Delta_2$) with the same spline kernel.

As noted, the inventive convolution method is exact for a convolution kernel d which is itself a polynomial spline kernel f (i.e., when d:=f). It is also true that convolution with any kernel d can be approximated with arbitrarily good accuracy by performing the invention with a suitably complicated spline function f≈d. Of course, the more complicated is the spline kernel f (i.e., higher degree δ and/or pivot count M) the greater the computational complexity, as suggested by the Theorem set forth above.

However, unlike for conventional wavelet approaches, the approximation error for particular implementations of the invention is trivial to estimate: if f be a spline approximation to the true convolution kernel d, then the error in the basic algorithm of the inventive method is:

$(f-d)\times p$, and so is bounded easily, especially if p is a binary pattern (a pattern determined by an array of binary bits). In the case that p is a binary pattern, an immediate upper bound on error is just $\eta \sup |f-d|$, where η is the normalization of the kernel d (i.e. the convolution of d with global unity). In embodiments in which p is a binary pattern, the invention can be implemented with even fewer multiplication and addition operations than implied by the Theorem set forth above.

One may wonder whether use of a recurrence relation to solve for elements of $r_{approx}=Fp$ (in preferred embodiments of the invention) is stable or error-prone. There are several answers to this, one being that if the invention is implemented using integer arithmetic throughout, it can be implemented with zero error (with respect to the spline itself).

A second answer is that floating point implementations are possible in which the recurrence is re-initialized (at least once) by brute-force evaluation of some triple $r_m, r_{m-1}, r_{m+2}$, thus re-igniting the algorithm (at least once) with reset of all error.

Before describing two-dimensional convolution in accordance with the invention, we note that the practically important acyclic convolution case is actually no harder to implement in accordance with the invention than the cyclic case. This is true for the simple reason that one simply applies the relevant algorithm (i.e., the relevant embodiment of the invention) with its recurrence relation to the coverage region of the kernel d. Thus, cyclic boundary conditions would not be required and, what is more, the usual technique of zero-padding to achieve acyclic convolution from a cyclic one is entirely unnecessary. Moreover, data indicative of a pattern p of any length or size can be convolved (either cyclically or acyclically) in accordance with the invention as there is no particular number-theoretical significance to where the recurrence relations are terminated. In this respect the invention is reminiscent of wavelet methods, as the latter often allow fairly general (although often not completely general) signal lengths.

We have described above embodiments of the invention for one-dimensional convolution (i.e., convolution of data indicative of a pattern p comprising a one-dimensional set of data values) with respect to a spline kernel (e.g., a quadratic-spline kernel). We next describe embodiments of the invention for two-dimensional convolution (i.e., convolution of data indicative of a pattern p comprising a two-dimensional array of data values) with respect to a spline kernel.

Figure 2:
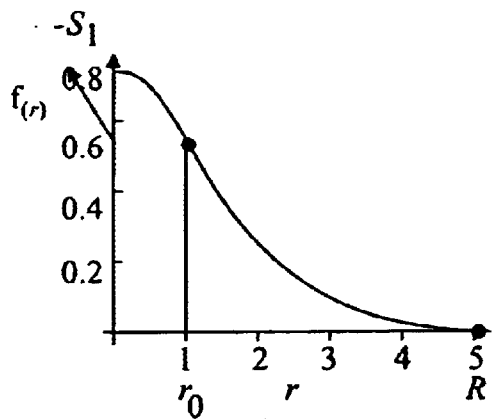
FIG. 2 is a graph of radially symmetric two-dimensional spline function f(r) used in preferred embodiments of the inventive method. Function f(r) is piecewise a quadratic polynomial $f_i$(r), with three pieces $f_0$(r), $f_1$(r) and $f_2$(r): $f_0$(r) defined for r less than or equal $r_0$:; $f_1$(r) defined for r greater than or equal to $r_0$ and less than or equal to R; and $f_2$ (r) defined to be zero ($f_2$(r)=0) for r>R.
Figure 3:
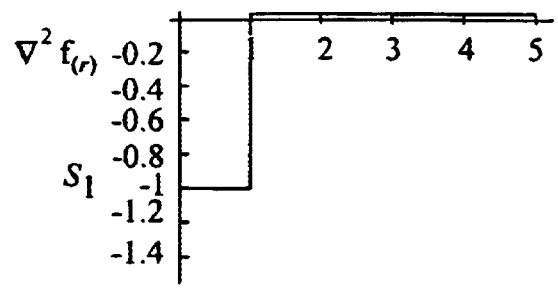
FIG. 3 is a graph of the Laplacian $\nabla^2 f$ of spline function f(r) of FIG. 2.

FIG. 2 is an example of a quadratic spline kernel used for convolving a two-dimensional pattern (i.e., data indicative of a two-dimensional array of pixels or other data values) in accordance with a class of preferred embodiments of the invention. The quadratic spline kernel of FIG. 2 is a radially-symmetric function f(r), which has the following properties:

1. f(r) vanishes at (and beyond) some appropriate radius r=R;
2. f(r) has an inflection point at $r=r_0$; and
3. The Laplacian $\nabla^2 f$ has a fixed negative value $s_1$ on the disk defined $r \leq r_0$, and a fixed positive value $S_2$ on $r_0 < r \leq R$ (as shown in FIG. 3).

It should be evident that the third condition is invoked since this causes the natural, 2-dimensional difference operator to yield locally flat (or locally nearly flat) curvature (as will be explained below).

In general, the condition:

$\nabla^2 f = s$ (locally constant)

over an annular region means that $\nabla^2$ is a flattening operator, since it implies that:

$4f(x, y) - f(x+1, y) - f(x, y+1) - f(x-1, y) - f(x, y-1) \approx -s$

The latter condition can be thought of as a 2-dimensional recurrence relation.

When implementing two-dimensional convolution in accordance with the invention to determine r=Fp (with the convolution kernel of interest d being equal to a spline kernel "f", so that D=F where "D" is the circulant of d and "F" is the circulant of f), if it is true that $\nabla^2 f = s$ (locally constant), then the convolution is an O(N) procedure.

One approach to precise, numerical implementation of two-dimensional convolution in accordance with the invention (using a radially-symmetric spline kernel f(r) satisfying the above-mentioned three criteria, with the finite-difference version of $\nabla^2$ as a flattening operator) is not to solve the Laplacian relations analytically, but to use computer-driven relaxation in order to force the above-mentioned second-order x,y-difference to yield precisely the relevant constant. Such relaxation operation can be performed to backsolve $\nabla^2 Fp = q$ to determine Fp, since the operator $\nabla^2 f$ is constant (flat) over both annular regions ($r < r_0$ and $r_0 < r \leq R$), with only a sparse "circle" of radius $r_0$ and some nearby elements departing from the flatness.

Figure 4:
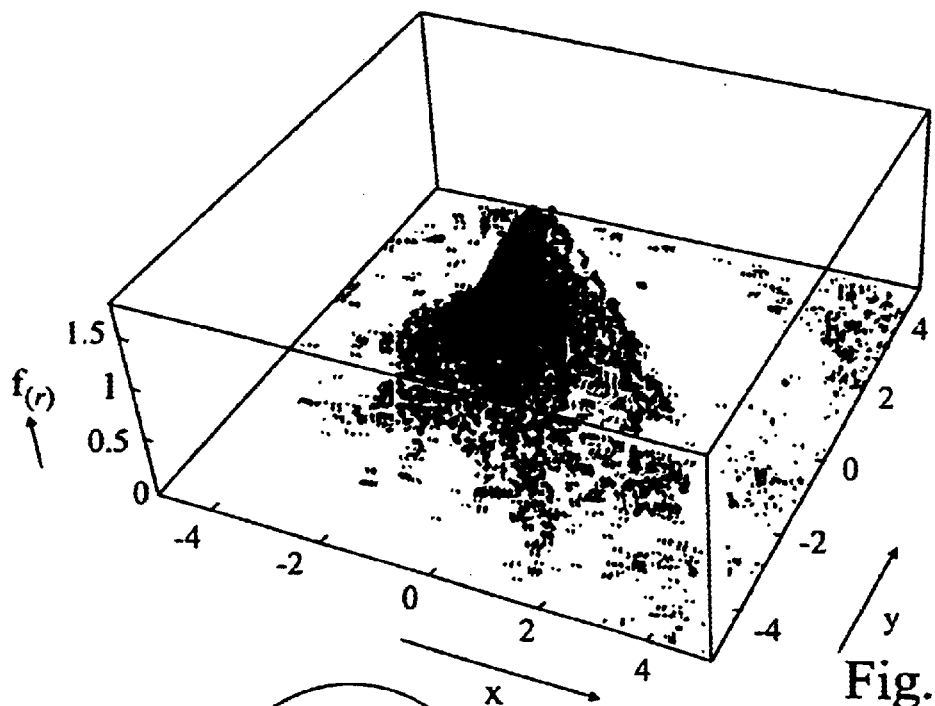
FIG. 4 is a graph of spline function f(r) of FIG. 2, versus rectangular coordinates x and y, where x=r(cos θ) and y=r(sin θ).

Even if a relaxation scheme is used to establish a truly flat matrix, an analytical determination of the 2-dimensional spline kernel f(r) will be of value in the initialization of the relaxation procedure (i.e., in the determination of the lowest components of Fp, which are then used to implement the relaxation procedure to determine the other components of Fp). To this end, we now give an analytical spline solution in the following form. There are various ways to constrain the spline f(r), so let us choose one way, in which the initial step is to determine the parameters $r_0$, R, $s_1$ as follows. To make the example clear, we assume that the convolution kernel d(r) is a Gaussian convolution kernel. We assess the curvature of d(r) at the origin (r=0) to determine $s_1$, the inflection radius of d(r) to determine $r_0$, and we select an effective radius R as some number of standard deviations beyond which convolution is unimportant. Then, we define a two-dimensional spline f by:.

$$f(r) = \begin{cases} a + r^2 s_1/4; r \leq r_0 \\ a + (r_0^2(s_1 - s_2) + r^2 s_2)/4 + r_0^2(s_1 - s_2)\log(r/r_0)/2; r_0 < r \leq R \end{cases}$$

where $$a = \frac{R^2 r_0^2 s_1 \log(R/r_0)}{2(r_0^2 - R^2)},$$

$$s_2 = \frac{s_1}{1 - R^2/r_0^2},$$

all of which gives the proper behavior under the noted constraints. This analytical expression for a spline kernel f(r) which approximates the Gaussian kernel d(r) was derived using 2-dimensional electrostatic theory. FIGS. 2 and 4 are graphs of a spline kernel, which is an example of the analytically determined class of spline kernels f(r) with the following parameters: r0=1, R=5, and $s_1$=-1. FIG. 2 is a graph of the spline kernel for one value of θ (in the r, θ plane). FIG. 4 is a graph of the spline kernel for a range of values of r and θ (in the r, θ plane).

The specified analytical expression for f(r) has the same functional form as does the electric potential due to a disk charge surrounded by an equal-opposite annulus of charge, all in the r, θ plane, with the outside edge of the annulus grounded to potential f:=0.

It will be appreciated that the spline kernel f(r) whose analytical expression is given above is not a polynomial spline kernel (since the second piece thereof, which is defined for $r_o < r < R$, is not a polynomial but is instead includes a term which is a logarithmic function of the parameter r). In some embodiments of the invention, a smooth kernel d is approximated by a spline kernel f which is not a polynomial spline kernel, but which consists of M pieces defined over adjacent segments of its range, and is flattened or annihalated by a flattening or annihilation operator. In preferred implementations of these embodiments, the convolution result $r_{approx} = Fp$ is determined by backsolving $Ar_{approx} = AFp$, where F is the circulant of spline kernel f, and A is the flattening or annihilation operator. In typical two-dimensional implementations of this class of embodiments, the spline kernel is a radially symmetric function whose range is some continuous or discrete set of values of the radial parameter.

Other implementations of two-dimensional convolution in accordance with the invention employ spline kernels f(r) which are more complicated than the spline kernel f(r) whose analytical expression is given above, and which correspond to more complicated electrostatic models in which a charge distribution is built up from concentric annuli of various (but locally-constant) charge densities. These annuli correspond to the spline segments of 1-dimensional spline kernels f(x). Using such more complicated spline kernels f(r), one can approximate arbitrarily closely a given convolution kernel d(r). However, as in one-dimensional embodiments, better approximation (achieved by using more annuli in two-dimensional embodiments) is at the expense of more required multiplication and addition operations for implementing a convolution. In any case, the complexity of (i.e., the number of multiplications and divisions required to implement) any multiple-annulus, 2-dimensional spline convolution will be on the order of the "area" (and equal to the product of the "area" with some factor k which depends on the particular characteristics of the spline kernel f(r) employed), where "area" denotes the number of data values (indexed by values in the r, θ plane) in the two-dimensional array of data values which determine the two-dimensional pattern p to be convolved.

We next describe preferred techniques for employing a two-dimensional recurrence relation to backsolve AFp=q to determine the convolution result Fp (where A is a flattening operator such as $A=\nabla^2 F$ or an annihilation operator), assuming that one has previously determined a spline kernel f(x, y) which is an adequate approximation of (or is identical to) a convolution kernel d of interest. In a discrete model in which the spline kernel f(x, y) has piecewise flat curvature in the sense of second-order finite differences being locally constant and the pattern p to be convolved is an N×N' array of pixels or other data values (where N and N' are large numbers), one can "ignite" the recurrence relation calculation using precomputed data values along the first two rows (y=0 with all values of x, and y=1 with all values of x), and the left-hand column (x=0, and all y) of the N×N' array. These precomputed strips of the full convolution would be produced via O(N+N') direct multiplications. It is evident that one can proceed lexicographically along successive rows of the pattern, filling in precise values from the recurrence relation:

$$f(x, y+1)=4f(x, y)-f(x-1, y)-f(x, y-1)-f(x+1, y)+E(x, y),$$

where the error term E(x, y) is computed initially, then updated with its own recurrence based on thin, circular corrections at inflection radius $r_0$. In this way the computational complexity of the overall convolution is O(NN'), i.e., it is KNN' (where K is a constant). One must take care in this discrete scenario: the implied big-O constant (the constant K) can depend on $r_0$ and other parameters, due to the unique character of 2-dimensional geometry. Still, the computational complexity of the inventive method is as low as can be expected for any image convolution scheme.

There are at least two other classes of two-dimensional implementations of the inventive method of convolution. In one class, the approach is simply to use one extra differencing (in the x-direction, for example) so that the continuous flattening or annihilation operator employed is $(\delta/\delta x)\nabla^2$. The operator $(\delta/\delta x)\nabla^2$ is not a flattening operator but is instead an annihilation operator, and while the recurrence relation (discrete Laplacian relation) will become slightly more computationally expensive (than in the above-described embodiment employing the flattening operator $\nabla^2$), the error term E(x, y) (corresponding to the error term in the above-described embodiment) is more controlled. In fact, in embodiments employing the annihilation operator $(\delta/\delta x)\nabla^2$, the correction term E(x, y) is just a simple sum over the aforementioned thin circles at radius $r_0$, for those are the positions of the nonvanishing elements in the sparse operation.

There is a more general operator class for two-dimensional spline convolution, which class allows exact, integer-based calculation, as there are no logarithmic component to the spline. Define a kernel f as:

$$f(x,y)=a(r_0^4-2r_0^2(x^2+y^2)+x^2+y^2)^2)$$

for radius $\sqrt{x^2+y^2} \leq r_0$, else f:=0. Here, a and $r_0$ are tuning parameters for the spline, which is now of bivariate polynomial form, devoid of logarithmic terms. This kernel f is flattened by the operator $\nabla^4$ defined in turn by matrix-based convolution:

$$\nabla^4 f := \begin{pmatrix} 0 & 0 & 1 & 0 & 0 \\ 0 & 2 & -8 & 2 & 0 \\ 1 & -8 & 20 & -8 & 1 \\ 0 & 2 & -8 & 2 & 0 \\ 0 & 0 & 1 & 0 & 0 \end{pmatrix} \times f.$$

The steps, then, for exact, acyclic, two-dimensional convolution with respect to this $\nabla^4$ operator are:
1) Zero-pad the given pattern p;
2) Use $E:=(\nabla^4 f) \times p$, by proceeding lexicographically, to generate the solution r=f×p.

This scheme, when implemented, is an O(N) method where N is the total number of pattern pixels of p; moreover the calculations when integer based are exact.

In another class of 2-dimensional implementations of the inventive method, discrete convolution is performed employing a matrix formalism, whereby a 2-dimensional pixel rectangle is converted into a 1-dimensional column vector using lexicographical indexing. In this case the circulant matrix F becomes an NN'-by-NN' monstrosity, but when an annihilation operator A (any reasonable differencing of the discrete Laplacian) is applied, the operator AF will be sparse. This class of embodiments has the advantage of converting the nonvanishing circular regions to deterministically-indexed matrix elements.

In some embodiments, the invention is a method for performing convolution of a pattern p (determined by a set of N pixels) with a smooth kernel, where the smooth kernel is at least approximately equal to a polynomial spline kernel determined by M polynomial spline segments and having circulant F. (where at least one of the segments has degree δ and none of the segments has degree greater than δ), said method including the steps of:
(a) processing pattern data indicative of the pattern p and kernel data indicative of the spline kernel to generate additional data indicative of q=AFp, where A is an annihilation operator (preferably, the above-defined annihilation operator $A_{\delta+1}$); and
(b) processing the additional data to backsolve $Ar_{approx}=q$ for $r_{approx}$, thus generating data at least approximately indicative of the convolution of the pattern with the smooth kernel, wherein steps (a) and (b) together require no more than (δ+1)N multiplies+δ (2M+1)N additions.

In other embodiments, the invention is a method for performing convolution of a pattern p (determined by a set of N pixels) with a smooth kernel, where the smooth kernel is at least approximately equal to a polynomial spline kernel determined by M polynomial spline segments and having circulant F (where at least one of the segments has degree δ and none of the segments has degree greater than δ), said method including the steps of:
(a) processing pattern data indicative of the pattern p and kernel data indicative of the spline kernel to generate additional data indicative of q=CFp, where A is a flattening operator (preferably, the above-defined flattening operator $A_\delta$); and
(b) processing the additional data to backsolve $Ar_{approx}=q$ for $r_{approx}$, thus generating data at least approximately indicative of the convolution of the pattern with the smooth kernel, wherein steps (a) and (b) together require no more than (δ)N multiplies+δ (2M+1)N additions.

Figure 5:
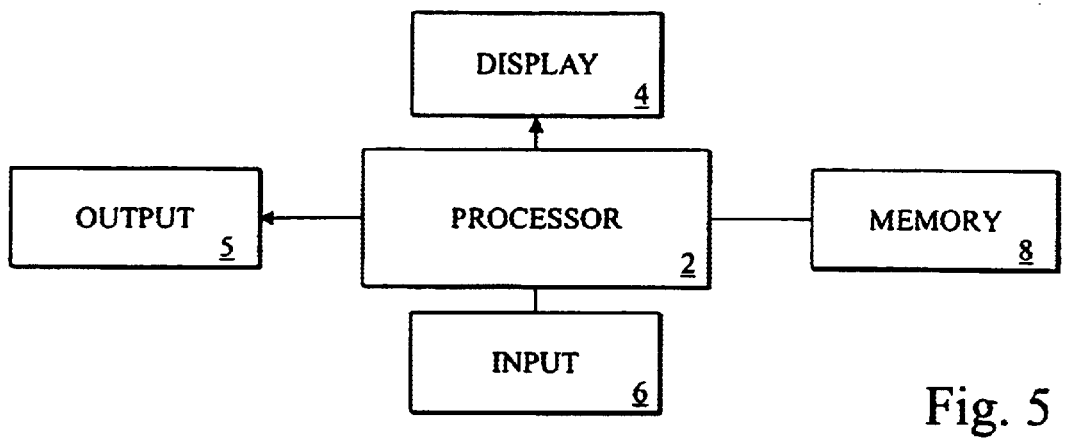
FIG. 5 is a block diagram of a computer system programmed with software for implementing the inventive method.

FIG. 5 is a block diagram of a computer system which embodies the invention. The system includes processor 2

(which is programmed with software for implementing any embodiment of the inventive convolution method), display device 4, input device 6, and memory 8 (and optionally also output device 5) coupled to processor 2. Where processor 2 is a typical processor configured to process binary data, it is programmed with software for implementing a "discrete" implementation of the inventive method. Typically, memory 8 stores data indicative of the circulant D of the convolution kernel d, the circulant F of the spline kernel k, the pattern p to be convolved, intermediate quantities generated during performance of the method, and data indicative of the convolved signal $r_{approx}$=Fp. In some implementations, processor 2 is programmed to determine (from a user-specified convolution kernel d of interest) particular parameters of a spline kernel f which cause the spline kernel to approximate the convolution kernel d (subject to user-specified constraints). In some implementations, processor 2 generates one or more look-up tables, stores them in memory 8 (or a cache memory associated with processor 2), and then accesses the stored look-up tables during performance of the invention. The user controls processor 2 (including by specifying processing parameters or constraints) using input device 6. Text and images generated by processor 2 (such as representations of a two-dimensional pattern p to be convolved and the convolution result Fp generated in accordance with the invention) are displayed on display device 4. Output device 5 (which can be employed instead of or in addition to display device 4) is preferably a pattern-capable device such as a sound reproduction unit, an I/O port (input/output port), or a signal processing (and/or storage) device (or system).

Figure 6:
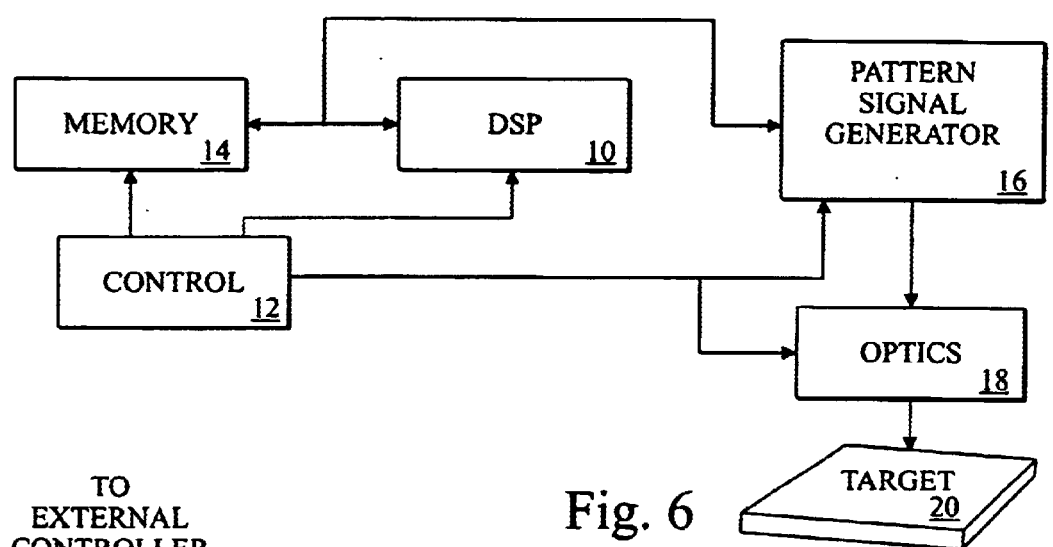
FIG. 6 is a block diagram of a lithography system including a digital signal processor configured to perform convolution (in accordance with the invention) on image data, and a device which generates a pattern signal (e.g., an optical beam electron beam having time-varying amplitude) from the resulting convolved image data. The pattern signal is provided to a set of optics (e.g., reflective or refractive optics, or electron beam optics) and the output of the optics is projected as a pattern on a glass plate, thus producing a mask useful in integrated circuit manufacture.

FIG. 6 is a block diagram of a lithography system including digital signal processor ("DSP") 10 which is configured to perform convolution (in accordance with the invention) on image data stored in memory unit 14. The image data stored in memory unit 14 determines the pattern p to be convolved. DSP 10 processes the image data to generate output data indicative of the convolution result $r_{approx}$=Fp. The output data is stored in memory 14 (and optionally undergoes further processing) and/or is output to "pattern signal" generation device 16. Device 16 generates a pattern signal (e.g., a beam of optical or other electromagnetic radiation having time-varying amplitude or an electron beam having time-varying amplitude) in response to data it receives from DSP 10.

In a class of embodiments, device 16 emits a beam of optical radiation which is incident on optics 18 to cause optics 18 to project an output beam on lithography target 20. Optics 18 scans the output beam across lithography target 20, in response to scan control signals from control unit 12. The amplitude of the beam emitted from device 16 varies as a function of time (in response to the output data from DSP 10, which assumes the scan pattern determined by the scan control signals from unit 12) in such a manner that the scanned output beam (the output of optics 18) exposes target 20 to a pattern of pixels.

In other embodiments, device 16 emits an electron beam which is incident on optics 18, to cause optics 18 to project an output electron beam on lithography target 20. Optics 18 scans the output electron beam across target 20, in response to scan control signals from control unit 12. The amplitude of the electron beam emitted from device 16 varies as a function of time (in response to the output data from DSP 10, which assumes the scan pattern determined by the scan control signals from unit 12) in such a manner that the scanned output beam from optics 18 exposes target 20 to a pattern of pixels.

Alternatively, device 16 can emit radiation which is focused (without being scanned) by optics 18 to project on target 20 an image comprising pixels, said image determining a pattern. For example, one embodiment of device 16 emits optical radiation which is focused by optics 18 so as to project from optics 18 as a pattern on target 20, without the need for optics 18 to scan any beam across target 20.

We shall refer to the output of device 16 as a "pattern signal," recognizing that examples of such pattern signal include a beam of optical or other radiation to be scanned by optics 18, an electron beam to be scanned by optics 18, and radiation to be focused but not scanned by optics 18. Optics 18 can be a set of reflective and/or refractive optics (with or without scanning capability, including means for moving one or more elements of the optics to scan a beam across target 20), or it can be a set of electron beam optics (with scanning capability, including means for moving one or more elements thereof to scan an electron beam across target 20). The output of optics 18 is projected (e.g., including by being scanned) as a pattern on lithography target 20.

Typically, target 20 is a glass plate (so that projection of the pattern thereon produces a mask useful in integrated circuit manufacture) or a semiconductor wafer. Optics 18 typically focuses the pattern signal so that a very small pattern is projected on target 20.

Although the "raw" pattern signal that is output from device 16 determines a pattern, diffraction artifacts (or other artifacts) introduced by optics 18 (or inherent in the interaction between the imaging beam and target 20) may cause the pattern actually projected on target 20 to differ from this pattern. For example, consider the case that the "raw" pattern signal output from device 16 is an electron beam to be focused by electron beam optics 18, and scanned onto a sequence of pixels on target 20, in an effort to project on target 20 a pattern determined by the amplitude of the focused electron beam incident on each single pixel of the sequence. In this case, the well known "proximity problem" (discussed above) causes exposure of an area surrounding each pixel on which the focused electron beam is incident (due to scattering of electrons away from each such pixel to the surrounding areas of the target). As a result, the pattern actually projected on target 20 is determined by superposition of the results of directing the focused electron beam at each pixel of the sequence, where a multi-pixel region is exposed each time the focused electron beam is incident at one of the pixels of the sequence.

Thus, DSP 10 is configured to generate output data which will cause device 16 to output a "raw" pattern signal having the characteristics that are needed to cause projection of a desired pattern on target 20. To accomplish this, DSP 10 performs a deconvolution operation on a large array of pixels (image data stored in memory 14) in order to compensate for any artifacts expected to be introduced by optics 18 and/or any expected scattering (by target 20) of an electron beam incident on target 20 from optics 18. The deconvolution operation performed by DSP 10 includes a convolution operation (performed in accordance with the invention) on stored image data that it retrieves from memory 14, where the image data determines a very large array of pixels which in turn determines a pattern "p". DSP 10 thus processes the image data in accordance with the present invention to generate data indicative of the convolution result $r_{approx}$=Fp. The latter data is then asserted to device 16, or is further processed prior to assertion to device 16.

Controller 12 of the FIG. 6 system provides appropriate control signals to units 10, 14, 16, and 18, and is capable (for example) of downloading instructions to DSP 10 to cause it to execute the convolution operation with specified parameters.

Figure 7:
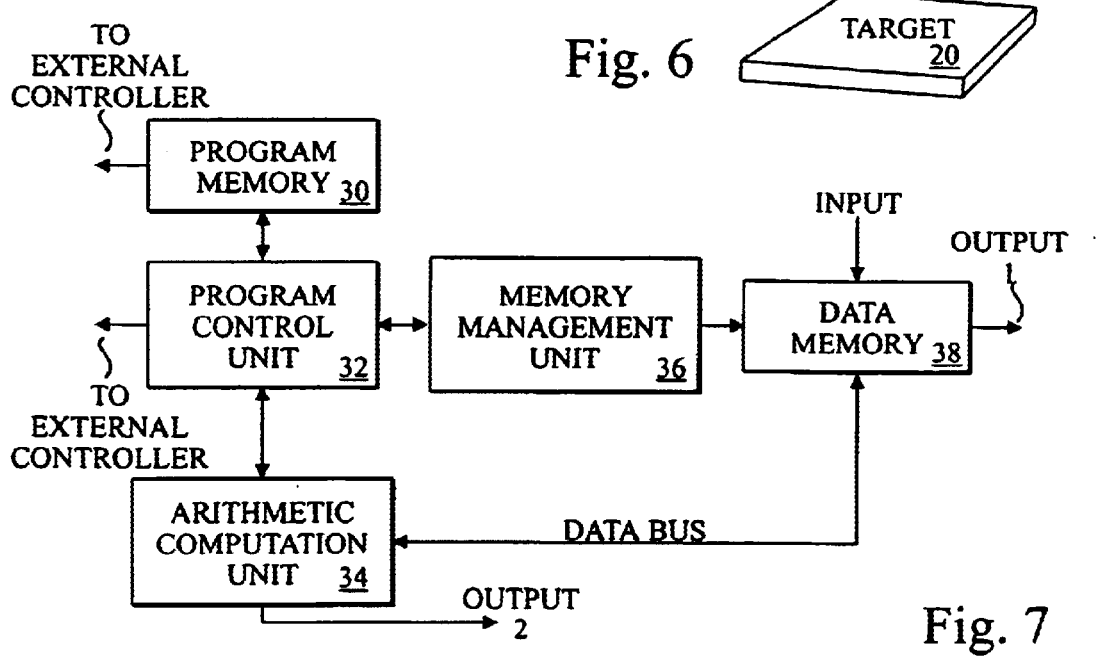
FIG. 7 is a block diagram of a digital signal processor (which can be used as the digital signal processor of FIG. 6) configured to perform convolution (in accordance with the invention) on image data.

FIG. 7 is a block diagram of a digital signal processor (DSP) which can be used as DSP 10 of FIG. 6, and which is configured to perform convolution in accordance with the invention on image data. The DSP of FIG. 7 includes arithmetic computational unit (ACU) 34 which includes addition and multiplication circuitry (for performing the matrix multiplication and recurrence relation operations required to implement the convolution), program memory 30 (which stores the instructions which are executed by the DSP to perform the convolution operation), program control unit (PCU) 32, memory management unit 36, and data memory 38, connected as shown. In response to commands from a user, controller 12 of FIG. 6 loads appropriate instructions into memory 30, and data indicative of a pattern "p" (the data labeled "INPUT" in FIG. 7) is loaded into memory 38.

PCU 32 includes instruction fetch circuitry for fetching a sequence of the instructions from program memory 30, instruction decoding circuitry, and registers for storing control bits generated by the decoding circuitry for assertion at appropriate times to unit 36 and/or unit 34.

Memory management unit 36 is configured to generate address signals (each identifying a memory location in memory 38 for writing data to or reading data from) in response to control bits from PCU 32, and to assert such address signals over an address bus to memory 38. Thus, in response to control bits from PCU 32 (which have been generated in PCU 32 by decoding instructions from program memory 30), unit 36 asserts address signals to data memory 38.

In response to the addresses asserted by memory management unit 36, data memory 38 sends signals indicative of data to ACU 34 (over a data bus). The resulting output signals from ACU 34 (indicative of partially processed data, or of the final convolution result, $r_{approx}$=Fp, where D is the circulant of polynomial spline kernel "f") can propagate over the data bus to memory 38 for storage at locations of memory 38 determined by addresses asserted by unit 36 to memory 38. In some implementations, memory 38 functions as an I/O buffer for the DSP, and data indicative of the final convolution result is output from memory 38 (as output data "OUTPUT1") to pattern signal generator 16. In other implementations, data indicative of the final convolution result streams directly (or through a buffer) to pattern signal generator 16 from ACU 34 (as output data "OUTPUT2").

Figure 8:
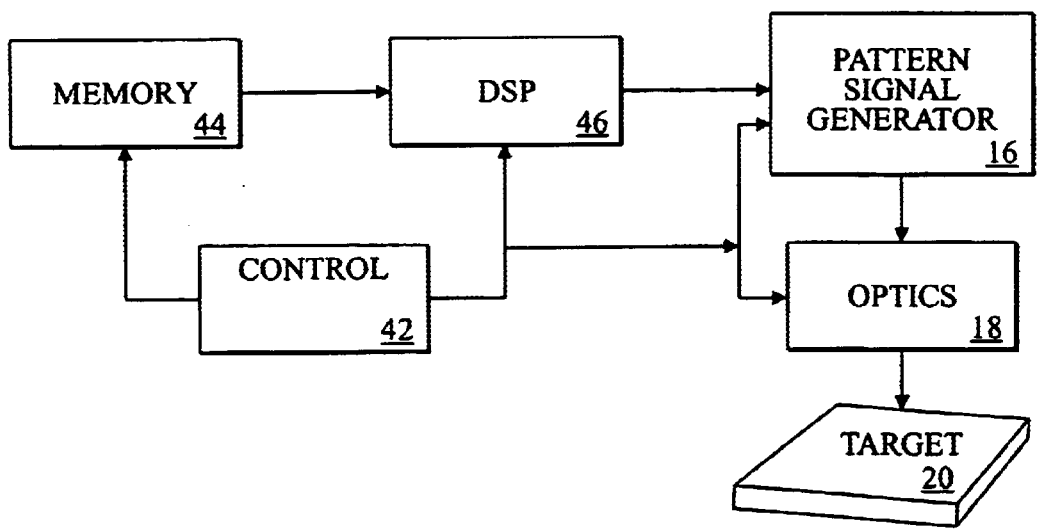
FIG. 8 is a block diagram of a lithography system which is a variation on the system of FIG. 6.

FIG. 8 is a variation on the system of FIG. 6, in which elements 16, 18, and 20 are identical to identically numbered elements of FIG. 6. In the FIG. 8 embodiment, element 46 is configured to perform convolution (in accordance with any embodiment of the invention) on image data (determining the pattern p to be convolved) which it receives from memory unit 44. Element 46 (which can be a digital signal processor including digital signal processing circuitry configured to perform convolution on data in accordance with any embodiment of the inventive method, custom or dedicated electronic circuitry configured to perform convolution on data in accordance with any embodiment of the inventive method, or a programmable gate array-based computing system configured to perform convolution on data in accordance with any embodiment of the inventive method) processes the image data to generate output data indicative of the convolution result $r_{approx}$=Fp. The output data is streamed directly from DSP to pattern signal generation device 16, and device 16 generates a pattern signal in response to the output data from element 46. Controller 42 of the FIG. 8 system provides appropriate control signals to elements 44, 46, 16, and 18, and is capable (for example) of downloading instructions to element 46 to cause it to execute the convolution operation with specified parameters.

It is contemplated that the DSP of FIG. 7 can implement any embodiment of the inventive method. At the end of a convolution operation, processed data indicative of the convolution result $r_{approx}$=Fp will have been generated. This data can be streamed directly to device 16, or it can be further processed (e.g., in unit 34) and thereafter asserted to device 16 or to memory 14.

The inventive method can implement any convolution (r=d×p, where × denotes the cross product), provided that the convolution kernel ("d") is sufficiently smooth to be adequately approximated by a spline kernel ("f"), in the following sense. Kernel "d" is adequately approximated by spline kernel "f" if the error inherent in the method (which is (f−d)×p) is within acceptable limits. Typically, convolution kernels "d" employed in the field of electron beam lithography proximity error correction are sufficiently smooth to be adequately approximated by a spline kernel "f." Convolution kernels that are noisy (random), such as those encountered in cryptography, are typically not sufficiently smooth to be adequately approximated by a spline kernel "If."

Figure 9:
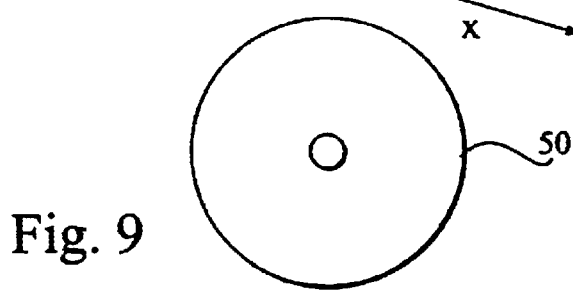
FIG. 9 is a simplified elevational view of a computer-readable storage medium (a CD-ROM) which stores computer-executable instructions, wherein the instructions are such that a computer performs an embodiment of the inventive method in response to executing the instructions.

FIG. 9 is a simplified elevational view of computer-readable storage medium 50 (which is a CD-ROM) which stores computer-executable instructions (software). The instructions are such that a computer performs an embodiment of the inventive method in response to executing the instructions.

Although the invention has been described in connection with specific preferred embodiments, it should be understood that the invention as claimed should not be unduly limited to such specific embodiments. For example, it is contemplated that in some embodiments the invention is implemented by hardwired circuitry (e.g., custom or dedicated electronic circuitry) or FPGA systems (field programmable gate array based computing systems) rather than in software or by a system including a digital signal processor ("DSP").

What is claimed is:

1. A method for performing convolution of a pattern p, determined by a set of N pixels, with a smooth kernel, where the smooth kernel is at least approximately equal to a polynomial spline kernel determined by M polynomial spline segments and having circulant F, at least one of the segments has degree δ, and none of the segments has degree greater than δ, said method including the steps of:

(a) processing pattern data indicative of the pattern p and kernel data indicative of the spline kernel to generate additional data indicative of q=AFp, where A is an annihilation operator; and (b) processing the additional data to backsolve $Ar_{approx}$=q for $r_{approx}$, thus generating data at least approximately indicative of the convolution of the pattern with the smooth kernel.

2. The method of claim 1, wherein steps (a) and (b) together require no more than δ(2M+1)N additions plus (δ+1)N multiplications other than by constants.

3. The method of claim 1, wherein A is an annihilation operator $\Delta_{\delta+1}$ having form $$\Delta_{\delta+1} = \begin{bmatrix} +\binom{\delta+1}{0} & -\binom{\delta+1}{1} & +\binom{\delta+1}{2} & -\binom{\delta+1}{3} & \cdots & 0 \\ 0 & +\binom{\delta+1}{0} & -\binom{\delta+1}{1} & +\binom{\delta+1}{2} & \cdots & 0 \\ \vdots & & & & & \vdots \\ -\binom{\delta+1}{1} & +\binom{\delta+1}{2} & \cdots & & 0 & +\binom{\delta+1}{0} \end{bmatrix}.$$

4. The method of claim 3, wherein step (b) includes the steps of:
  (c) performing an ignition operation in which the pattern data and the kernel data are processed to determine a small number of components Of $r_{approx}$=Fp; and
  (d) after step (c), determining all remaining components of $r_{approx}$=Fp using a natural recurrence relation determined by the polynomial spline kernel f and the operator $\Delta_{\delta+1}$.

5. A method for performing convolution of a pattern p, determined by a set of N pixels, with a smooth kernel, where the smooth kernel is at least approximately equal to a polynomial spline kernel determined by M polynomial spline segments and having circulant F, at least one of the segments has degree δ, and none of the segments has degree greater than δ, said method including the steps of:
  (a) processing pattern data indicative of the pattern p and kernel data indicative of the spline kernel to generate additional data indicative of q=CFp, where C is a flattening operator; and
  (b) processing the additional data to backsolve $Cr_{approx}$=q for $r_{approx}$, thus generating data at least approximately indicative of the convolution of the pattern with the smooth kernel.

6. The method of claim 5, wherein steps (a) and (b) together require no more than δ(2M+1)N additions plus (δ)N multiplications other than by constants.

7. The method of claim 5, wherein C is a flattening operator $\Delta_\delta$ having form $$\Delta_\delta = \begin{bmatrix} +\binom{\delta}{0} & -\binom{\delta}{1} & +\binom{\delta}{2} & -\binom{\delta}{3} & \cdots & 0 \\ 0 & +\binom{\delta}{0} & -\binom{\delta}{1} & +\binom{\delta}{2} & \cdots & 0 \\ \vdots & & & & & \vdots \\ -\binom{\delta}{1} & +\binom{\delta}{2} & \cdots & & 0 & +\binom{\delta}{0} \end{bmatrix}$$

8. The method of claim 7, wherein step (b) includes the steps of:
  (c) performing an ignition operation in which the pattern data and the kernel data are processed to determine a small number of components of $r_{approx}$=Fp; and
  (d) after step (c), determining all remaining components of $r_{approx}$=Fp using a natural recurrence relation determined by the polynomial spline kernel f and the operator $\Delta_\delta$.

9. A method for convolving first data indicative of a pattern p with a smooth kernel d having circulant D, wherein the kernel d is at least approximately equal to a spline kernel f having circulant F, said method including the steps of:
  (a) processing second data indicative of the spline kernel f and said first data to generate third data indicative of q=AFp, where A is an operator selected from the class of annihilation operators and flattening operators; and
  (b) processing the third data to backsolve $Ar_{approx}$=q for $r_{approx}$, to generate fourth data indicative of $r_{approx}$=Fp, whereby said fourth data is at least approximately indicative of r=Dp which is the convolution of the kernel d with the pattern p.

10. The method of claim 9, wherein the kernel d is not equal to the spline kernel f, and also including the step of:
  (c) prior to step (a), determining that the spline kernel f is an adequate approximation of the kernel d, and identifying said second data indicative of the spline kernel f.

11. The method of claim 10, wherein the spline kernel f is a polynomial spline kernel comprising polynomial segments, each of the segments is defined in a range between a different pair of pivot points, and step (c) includes the steps of:
  performing curve fitting to select each of the segments of the polynomial spline kernel f as one which adequately matches a corresponding segment of the kernel d, including by satisfying boundary conditions at each of the pivot points.

12. The method of claim 9, wherein the spline kernel f is a polynomial spline kernel.

13. The method of claim 12, wherein A is an annihilation operator.

14. The method of claim 13, wherein the pattern p is one-dimensional, the spline kernel f comprises M polynomial segments, where M is not less than one, δ is the maximum degree of the polynomial segments, the annihilation operator A operates on circulant F in such a manner that $\Delta_{\delta+1}F=B$ is sparse, and $\Delta_{\delta+1}$ has form $$\Delta_{\delta+1} = \begin{bmatrix} +\binom{\delta+1}{0} & -\binom{\delta+1}{1} & +\binom{\delta+1}{2} & -\binom{\delta+1}{3} & \cdots & 0 \\ 0 & +\binom{\delta+1}{0} & -\binom{\delta+1}{1} & +\binom{\delta+1}{2} & \cdots & 0 \\ \vdots & & & & & \vdots \\ -\binom{\delta+1}{1} & +\binom{\delta+1}{2} & \cdots & & 0 & +\binom{\delta+1}{0} \end{bmatrix}.$$

15. The method of claim 14, wherein step (b) includes the steps of:
  (c) performing an ignition operation in which the first data and the second data are processed to determine a small number of components of $r_{approx}$=Fp; and
  (d) after step (c), determining all remaining components of $r_{approx}$=Fp using a natural recurrence relation determined by the polynomial spline kernel f and the operator $\Delta_{\delta+1}$.

16. The method of claim 14, wherein the pattern p is determined by N data values and steps (a) and (b) are accomplished with no more than on the order of (δ+1)N multiplications other than by constants and no more than on the order of δ(2M+1)N additions.

17. The method of claim 14, wherein the pattern p is a two-dimensional pattern determined by NN' data values.

18. The method of claim 14, also including the steps of:
  (c) generating a pattern signal in response to convolved image data-determined at least in part by the fourth data; and
  (d) causing the pattern signal to be incident on a set of optics, and projecting a pattern image from the optics onto a lithography target in response to the pattern signal.

19. The method of claim 18, wherein the pattern signal is an optical signal.

20. The method of claim 18, wherein the pattern signal is an electron beam signal.

21. The method of claim 18, wherein the convolved image data employed in step (c) is the fourth data.

22. The method of claim 12, wherein step (b) includes the steps of:
- (c) performing an ignition operation in which the first data and the second data are processed to determine a small number of components of $r_{approx}=Fp$; and
- (d) after step (c), determining all remaining components of $r_{approx}=Fp$ using a natural recurrence relation determined by the polynomial spline kernel f and the operator A.

23. The method of claim 22, wherein the polynomial spline kernel f comprises M polynomial segments, where M is not less than one, $\delta$ is the maximum degree of the polynomial segments, the pattern p is determined by N data values, the operator A is an annihilation operator, and steps (a) and (b) are accomplished with no more than on the order of $(\delta+1)N$ multiplications other than by constants, and no more than on the order of $\delta(2M+1)N$ additions.

24. The method of claim 12, wherein A is a flattening operator.

25. The method of claim 24, wherein the pattern p is one-dimensional, the spline kernel f comprises M polynomial segments, where M is not less than one, $\delta$ is the maximum degree of the polynomial segments, the flattening operator A operates on the circulant F such that $B=\Delta_\delta F$ is almost everywhere a locally constant matrix, and $\Delta_\delta$ has form $$\Delta_\delta = \begin{bmatrix} +\binom{\delta}{0} & -\binom{\delta}{1} & +\binom{\delta}{2} & -\binom{\delta}{3} & \cdots & 0 \\ 0 & +\binom{\delta}{0} & -\binom{\delta}{1} & +\binom{\delta}{2} & \cdots & 0 \\ \vdots & & & & & \vdots \\ -\binom{\delta}{1} & +\binom{\delta}{2} & \cdots & & 0 & +\binom{\delta}{0} \end{bmatrix}.$$

26. The method of claim 25, wherein step (b) includes the steps of:
- (c) performing an ignition operation in which the first data and the second data are processed to determine a small number of components Of $r_{approx}=Fp$; and
- (d) after step (c), determining all remaining components of $r_{approx}=Fp$ using a natural recurrence relation determined by the polynomial spline kernel f and the operator $\Delta_\delta$.

27. The method of claim 25, wherein the pattern p is a two dimensional pattern determined by NN' data values.

28. The method of claim 25, wherein M=2, $\delta$=2, the polynomial spline kernel f is a radially-symmetric quadratic spline kernel f(r) which vanishes where $R \leq r$, the kernel f(r) has an inflection point at $r=r_0$, and the Laplacian $\nabla^2 f(r)$ has a fixed negative value $s_1$ on a disk defined by $r \leq r_0$, and a fixed positive value $s_2$ where $r_0 < r \leq R$.

29. The method of claim 25, also including the steps of:
- (c) generating a pattern signal in response to convolved image data determined at least in part by the fourth data; and
- (d) causing the pattern signal to be incident on a set of optics, and projecting a pattern image from the optics onto a lithography target in response to the pattern signal.

30. The method of claim 29, wherein the pattern signal is an optical signal.

31. The method of claim 29, wherein the pattern signal is an electron beam signal.

32. The method of claim 29, wherein the convolved image data employed in step (c) is the fourth data.

33. The method of claim 24, wherein the polynomial spline kernel f is a radially-symmetric quadratic spline kernel f(r) which vanishes where $R \leq r$, where R is a parameter, the kernel f(r) has an inflection point at $r=r_0$, and the Laplacian $\nabla^2 f(r)$ has a fixed negative value $s_1$ on a disk defined by $r \leq r_0$, and a fixed positive value $s_2$ where $r_0 < r \leq R$.

34. The method of claim 12, wherein the pattern p is determined by N data values, the operator A is an annihilation operator, the polynomial spline kernel f comprises M polynomial segments, where M is not less than one, $\delta$ is the maximum degree of the polynomial segments, and steps (a) and (b) implement cyclic convolution with no more than on the order of $(\delta+1)N$ multiplications other than by constants, and no more than on the order of $\delta(2M+1)N$ additions.

35. The method of claim 12, wherein the pattern p is determined by N data values, the operator A is an annihilation operator, the polynomial spline kernel f comprises M polynomial segments, where M is not less than one, $\delta$ is the maximum degree of the polynomial segments, and steps (a) and (b) implement acyclic convolution with no more than on the order of $(\delta+1)N$ multiplications other than by constants, and no more than on the order of $\delta(2M+1)N$ additions.

36. The method of claim 12, wherein the first data, the third data, and the data indicative of the polynomial spline kernel f are binary data, and steps (a) and (b) implement acyclic convolution by processing the binary data without padding said binary data with zeros.

37. The method of claim 12, also including the steps of:
- (c) generating a pattern signal in response to convolved image data determined at least in part by the fourth data; and
- (d) causing the pattern signal to be incident on a set of optics, and projecting a pattern image from the optics onto a lithography target in response to the pattern signal.

38. The method of claim 37, wherein the pattern signal is an optical signal.

39. The method of claim 37, wherein the pattern signal is an electron beam signal.

40. The method of claim 37, wherein the convolved image data employed in step (c) is the fourth data.

41. A computer system, comprising:
- a processor programmed with software for convolving first data indicative of a pattern p with a smooth kernel d having circulant D, wherein the smooth kernel d is at least approximately equal to a spline kernel f having circulant F, by processing second data indicative of the spline kernel f and said first data to generate third data indicative of q=AFp, where A is an operator selected from the class of annihilation operators and flattening operators, and processing the third data to backsolve $q=Ar_{approx}$ for $r_{approx}$, thereby generating fourth data indicative of $r_{approx}=Fp$, whereby said fourth data is at least approximately indicative of r=Dp which is the convolution of d with p;
- at least one memory coupled to and accessible by the processor, and configured to store the first data, the second data, and the fourth data; and
- an input device coupled to the processor, wherein the processor executes the software in response to at least one control signal from the input device.

42. The computer system of claim 41, wherein the spline kernel f is a polynomial spline kernel.

43. The computer system of claim 42, wherein the processor is programmed to process the third data to backsolve $q=Ar_{approx}$ for $r_{approx}$ by performing an ignition operation in which it processes the first data and the second data to determine a small number of components of $r_{approx}=Fp$, and after the ignition operation, determining all remaining components of $r_{approx}=Fp$ using a natural recurrence relation determined by the polynomial spline kernel f and the operator A.

44. The computer system of claim 43, wherein the polynomial spline kernel f comprises M polynomial segments, where M is not less than one, δ is the maximum degree of the polynomial segments, the pattern p is determined by N data values, the operator A is an annihilation operator, and the processor is programmed to process the first data and the data indicative of the polynomial spline kernel f to generate the third data and to process the third data to generate the fourth data, with no more than on the order of (δ+1)N multiplications other than by constants, and no more than on the order of δ(2M+1)N additions.

45. The computer system of claim 42, wherein the pattern p is one-dimensional, the spline kernel f comprises M polynomial segments, where M is not less than one, δ is the maximum degree of the polynomial segments, the operator A is an annihilation operator which operates on circulant F in such a manner that $\Delta_{\delta+1}F=B$ is sparse, and $\Delta_{\delta+1}$ has form $$\Delta_{\delta+1} = \begin{bmatrix} +\binom{\delta+1}{0} & -\binom{\delta+1}{1} & +\binom{\delta+1}{2} & -\binom{\delta+1}{3} & \cdots & 0 \\ 0 & +\binom{\delta+1}{0} & -\binom{\delta+1}{1} & +\binom{\delta+1}{2} & \cdots & 0 \\ \vdots & & & & & \vdots \\ -\binom{\delta+1}{1} & +\binom{\delta+1}{2} & \cdots & & 0 & +\binom{\delta+1}{0} \end{bmatrix}.$$

46. The computer system of claim 42, wherein the pattern p is one-dimensional, the spline kernel f comprises M polynomial segments, where M is not less than one, δ is the maximum degree of the polynomial segments, the operator A is a flattening operator which operates on the circulant F such that $B=\Delta_\delta F$ is almost everywhere a locally constant matrix), and $\Delta_\delta$ has form $$\Delta_\delta = \begin{bmatrix} +\binom{\delta}{0} & -\binom{\delta}{1} & +\binom{\delta}{2} & -\binom{\delta}{3} & \cdots & 0 \\ 0 & +\binom{\delta}{0} & -\binom{\delta}{1} & +\binom{\delta}{2} & \cdots & 0 \\ \vdots & & & & & \vdots \\ -\binom{\delta}{1} & +\binom{\delta}{2} & \cdots & & 0 & +\binom{\delta}{0} \end{bmatrix}.$$

47. A digital signal processor, including:
digital signal processing circuitry configured to perform arithmetic operations on data including first data indicative of a pattern p, and second data indicative of a spline kernel f having circulant F, the spline kernel f being at least approximately equal to a smooth kernel d having circulant D; and
a program control unit coupled to the digital signal processing circuitry, and configured to generate control bits in response to instructions, and to assert the control bits to the digital signal processing circuitry to cause the digital signal processing circuitry to perform convolution on the first data by processing the first data and second data to generate third data indicative of $q=AFp$, where A is an operator selected from the class of annihilation operators and flattening operators, and processing the third data to backsolve $q=Ar_{approx}$ for $r_{approx}$, thereby generating fourth data indicative of $r_{approx}=Fp$, whereby said fourth data is at least approximately indicative of $r=Dp$ which is the convolution of d with p.

48. The digital signal processor of claim 47, wherein the digital signal processing circuitry is configured to process the third data in response to the control bits to backsolve $q=Ar_{approx}$ for $r_{approx}$ by performing an ignition operation in which it processes the first data and the second data to determine a small number of components of $r_{approx}=Fp$, and after the ignition operation to determine all remaining components of $r_{approx}=Fp$ using a natural recurrence relation determined by the spline kernel f and the operator A.

49. The digital signal processor of claim 47, wherein the spline kernel f is a polynomial spline kernel.

50. The digital signal processor of claim 49, wherein the polynomial spline kernel f comprises M polynomial segments, where M is not less than one, δ is the maximum degree of the polynomial segments, the pattern p is determined by N data values, the operator A is an annihilation operator, and the digital signal processing circuitry is configured to process the first data and the second data, in response to the control bits, to generate the third data and to process the third data in response to the control bits to generate the fourth data, with no more than on the order of (δ+1)N multiplications other than by constants, and no more than on the order of δ(2M+1)N additions.

51. The digital signal processor of claim 50, wherein the pattern p is one dimensional, the spline kernel f comprises M polynomial segments, where M is not less than one, δ is the maximum degree of the polynomial segments, the operator A is an annihilation operator which operates on circulant F in such a manner that $\Delta_{\delta+1}F=B$ is sparse, and $\Delta_{\delta+1}$ has form $$\Delta_{\delta+1} = \begin{bmatrix} +\binom{\delta+1}{0} & -\binom{\delta+1}{1} & +\binom{\delta+1}{2} & -\binom{\delta+1}{3} & \cdots & 0 \\ 0 & +\binom{\delta+1}{0} & -\binom{\delta+1}{1} & +\binom{\delta+1}{2} & \cdots & 0 \\ \vdots & & & & & \vdots \\ -\binom{\delta+1}{1} & +\binom{\delta+1}{2} & \cdots & & 0 & +\binom{\delta+1}{0} \end{bmatrix}.$$

52. The digital signal processor of claim 49, wherein the pattern p is one-dimensional, the spline kernel f comprises M polynomial segments, where M is not less than one, δ is the maximum degree of the polynomial segments, the operator A is a flattening operator which operates on the circulant F such that $B=\Delta_\delta F$ is almost everywhere a locally constant matrix), and $\Delta_\delta$ has form $$\Delta_\delta = \begin{bmatrix} +\binom{\delta}{0} & -\binom{\delta}{1} & +\binom{\delta}{2} & -\binom{\delta}{3} & \cdots & 0 \\ 0 & +\binom{\delta}{0} & -\binom{\delta}{1} & +\binom{\delta}{2} & \cdots & 0 \\ \vdots & & & & & \vdots \\ -\binom{\delta}{1} & +\binom{\delta}{2} & \cdots & & 0 & +\binom{\delta}{0} \end{bmatrix}.$$

53. A lithography system, including:
a digital signal processor, comprising digital signal processing circuitry and a program control unit coupled to the digital signal processing circuitry, the digital signal processing circuitry being configured to perform arithmetic operations on data including first data indicative of a pattern p, and second data indicative of a spline kernel f having circulant F, the spline kernel f being at least approximately equal to a smooth kernel d having circulant D, and the program control unit being configured to generate control bits in response to instructions, and to assert the control bits to the digital signal processing circuitry to cause the digital signal processing circuitry to perform a convolution operation on the first data by processing the first data and second data to generate third data indicative of q=AFp, where A is an operator selected from the class of annihilation operators and flattening operators, and processing the third data to backsolve q=Ar$_{approx}$ for r$_{approx}$, thereby generating fourth data indicative of r$_{approx}$=Fp, whereby said fourth data is at least approximately indicative of r=Dp which is the convolution of d with p;

a pattern signal generator configured to generate a pattern signal in response to convolved image data determined at least in part by said fourth data; and a set of optics positioned so that the pattern signal is incident thereon, wherein the optics projects a pattern image on a lithography target in response to the pattern signal.

54. The lithography system of claim 53, wherein the digital signal processor asserts the fourth data to the pattern signal generator, and the pattern signal generator is configured to generate the pattern signal in response to said fourth data.

55. The lithography system of claim 54, wherein the pattern signal is an optical signal.

56. The lithography system of claim 55, wherein the optical signal is an optical beam and the set of optics is configured to focus the optical beam to generate a focused beam and to scan the focused beam relative to the lithography target.

57. The lithography system of claim 54, wherein the pattern signal is an electron beam signal.

58. The lithography system of claim 57, wherein the set of optics is configured to focus the electron beam signal to generate a focused electron beam and to scan the focused electron beam relative to the lithography target.

59. The lithography system of claim 53, wherein the digital signal processing circuitry is configured to process the third data in response to the control bits to backsolve q=Ar$_{approx}$ for r$_{approx}$ by performing an ignition operation in which it processes the first data and the second data to determine a small number of components of r$_{approx}$=Fp, and after the ignition operation to determine all remaining components of r$_{approx}$=Fp using a natural recurrence relation determined by the polynomial spline kernel f and the operator A.

60. The lithography system of claim 53, wherein the spline kernel f is a polynomial spline kernel.

61. The lithography system of claim 60, wherein the polynomial spline kernel f comprises M polynomial segments, where M is not less than one, δ is the maximum degree of the polynomial segments, the pattern p is determined by N data values, the operator A is an annihilation operator, and the digital signal processing circuitry is configured to process the first data and the second data in response to the control bits, to generate the third data and to process the third data in response to the control bits to generate the fourth data, with no more than on the order of (δ+1)N multiplications other than by constants, and no more than on the order of δ(2M+1)N additions.

62. The lithography system of claim 61, wherein the pattern p is two-dimensional, the spline kernel f comprises M polynomial segments, where M is not less than one, δ is the maximum degree of the polynomial segments, the operator A is an annihilation operator which operates on circulant F in such a manner that $\Delta_{\delta+1}F=B$ is sparse, and $\Delta_{\delta+1}$ has form $$\Delta_{\delta+1} = \begin{bmatrix} +\binom{\delta+1}{0} & -\binom{\delta+1}{1} & +\binom{\delta+1}{2} & -\binom{\delta+1}{3} & \cdots & 0 \\ 0 & +\binom{\delta+1}{0} & -\binom{\delta+1}{1} & +\binom{\delta+1}{2} & \cdots & 0 \\ \vdots & & & & & \vdots \\ -\binom{\delta+1}{1} & +\binom{\delta+1}{2} & \cdots & & 0 & +\binom{\delta+1}{0} \end{bmatrix}.$$

63. The lithography system of claim 60, wherein the pattern p is two-dimensional, the spline kernel f comprises M polynomial segments, where M is not less than one, δ is the maximum degree of the polynomial segments, the operator A is a flattening operator which operates on the circulant F such that $B=\Delta_\delta F$ is almost everywhere a locally constant matrix), and $\Delta_\delta$ has form $$\Delta_\delta = \begin{bmatrix} +\binom{\delta}{0} & -\binom{\delta}{1} & +\binom{\delta}{2} & -\binom{\delta}{3} & \cdots & 0 \\ 0 & +\binom{\delta}{0} & -\binom{\delta}{1} & +\binom{\delta}{2} & \cdots & 0 \\ \vdots & & & & & \vdots \\ -\binom{\delta}{1} & +\binom{\delta}{2} & \cdots & & 0 & +\binom{\delta}{0} \end{bmatrix}.$$

64. An apparatus configured to convolve a pattern p with a smooth kernel d having circulant D, the kernel d being at least approximately equal to a spline kernel f having circulant F, said apparatus being configured to process a first signal indicative of the spline kernel f and a second signal indicative of the pattern p to generate a third signal indicative of q=AFp, where A is an operator selected from the class of annihilation operators and flattening operators, and to process the third signal to backsolve Ar$_{approx}$=q for r$_{approx}$ and generate a fourth signal indicative of r$_{approx}$=Fp, whereby said fourth signal is at least approximately indicative of r=Dp which is the convolution of the kernel d with the pattern p.

65. The apparatus of claim 64, wherein the apparatus consists of electronic circuitry.

66. The apparatus of claim 64, wherein the apparatus is a programmable gate array-based computing system.

67. The apparatus of claim 64, wherein the spline kernel f is a polynomial spline kernel.

68. A computer-readable storage medium which stores instructions, wherein the instructions are executable by a computer, and wherein the instructions are such that the computer performs a method for convolving first data indicative of a pattern p with a smooth kernel d having circulant D in response to executing said instructions, wherein the kernel d is at least approximately equal to a spline kernel f having circulant F, said method including the steps of:

processing second data indicative of the spline kernel f and said first data to generate third data indicative of q=AFp, where A is an operator selected from the class of annihilation operators and flattening operators; and processing the third data to backsolve Ar$_{approx}$=q for r$_{approx}$, to generate fourth data indicative of r$_{approx}$=Fp, whereby said fourth data is at least approximately indicative of r=Dp which is the convolution of the kernel d with the pattern p.

69. The apparatus of claim 68, wherein the spline kernel f is a polynomial spline kernel.

* * * * *